United States Patent
Nitta et al.

(10) Patent No.: US 6,334,014 B1
(45) Date of Patent: Dec. 25, 2001

(54) OPTICAL FIBER APPARATUS PROVIDED WITH DEMULTIPLEXING/MULTIPLEXING UNIT ON FIBER'S END PORTION, OPTICAL DETECTING APPARATUS PROVIDED WITH DEMULTIPLEXING/MULTIPLEXING UNIT ON ITS LIGHT RECEIVING SURFACE, AND OPTICAL TRANSMISSION SYSTEM USING THE SAME

(75) Inventors: Jun Nitta, Ninomiya-machi; Yuichi Handa, Atsugi; Takahiro Numai, Ninomiya-machi, all of (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/427,661

(22) Filed: Oct. 27, 1999

(30) Foreign Application Priority Data

| Nov. 2, 1998 | (JP) | 10-327490 |
| Nov. 13, 1998 | (JP) | 10-341123 |

(51) Int. Cl.⁷ .............................. G02B 6/26; G02B 6/293
(52) U.S. Cl. .............................. 385/39; 359/127; 385/24; 385/31; 385/49
(58) Field of Search .............................. 385/15, 24, 31, 385/37, 38, 39, 47–49, 139; 359/124, 127–131

(56) References Cited

U.S. PATENT DOCUMENTS

| 4,274,706 | * | 6/1981 | Tangonan | 385/37 |
| 4,511,208 | * | 4/1985 | Ozeki et al. | 385/24 |
| 4,693,544 | * | 9/1987 | Yamasaki et al. | 385/47 |
| 4,830,451 | * | 5/1989 | Stone | 385/31 |
| 4,880,289 | * | 11/1989 | Imoto et al. | 359/131 |
| 5,355,237 | * | 10/1994 | Lang et al. | 359/130 |
| 5,479,547 | * | 12/1995 | Kunikane et al. | 385/47 |

FOREIGN PATENT DOCUMENTS

| 8-82711 | 3/1996 | (JP) . |
| 8-211237 | 8/1996 | (JP) . |

* cited by examiner

Primary Examiner—John D. Lee
(74) Attorney, Agent, or Firm—Fitzpatrick, Cella, Harper & Scinto

(57) ABSTRACT

An optical fiber apparatus includes an optical fiber, and a demultiplexing/multiplexing unit for demultiplexing or multiplexing at least a light wave of at least a wavelength with a sufficiently narrow wavelength spectrum that is determined by a resolving power thereof, such as a Fabry-Perot etalon. The demultiplexing/multiplexing unit is provided or formed directly on at least an end face of the optical fiber. An optical detector array including a plurality of optical detectors for detecting demultiplexed light waves may be provided on a light emergence surface of of the demultiplexing/multiplexing unit.

48 Claims, 18 Drawing Sheets

FIG.21
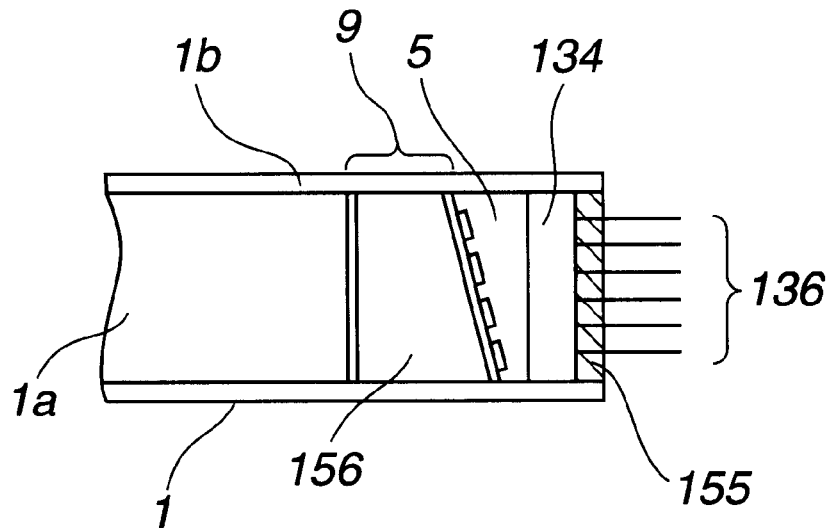
FIG.22A
FIG.22b
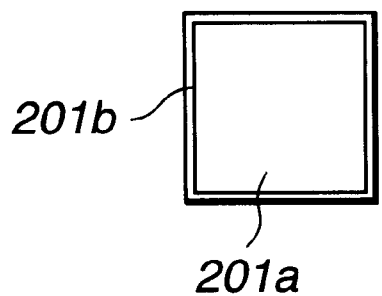
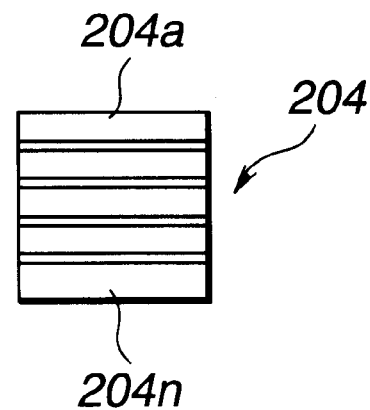

OPTICAL FIBER APPARATUS PROVIDED WITH DEMULTIPLEXING/MULTIPLEXING UNIT ON FIBER'S END PORTION, OPTICAL DETECTING APPARATUS PROVIDED WITH DEMULTIPLEXING/MULTIPLEXING UNIT ON ITS LIGHT RECEIVING SURFACE, AND OPTICAL TRANSMISSION SYSTEM USING THE SAME

BACKGROUND OF THE INVENTION

1. Field of the Invention

The present invention relates to an optical fiber apparatus provided with a demultiplexing/multiplexing unit on its fiber's end surface, such as an optical fiber provided with an optical detector array having a demultiplexing function for separating wavelength multiplexed signals of a wavelength division multiplexing (WDM) optical transmission and for receiving separated optical signals by respective optical detectors, an optical detecting apparatus provided with a demultiplexing-multiplexing unit on its light receiving surface, and an optical transmission system using the same.

2. Related Background Art

Conventionally, the following combination structures were proposed as an optical detector having a demultiplexing function for demultiplexing wavelength multiplexed signals and for receiving respective demultiplexed optical signals, as disclosed in Japanese Laid-Open Patent Nos. 8(1996)-82711 and 8(1996)-211237. In one structure, a device having a combination of a branching function and an optical filter (band-pass) function is used. In another structure, so-called array-waveguide diffraction gratings are used as a demultiplexer and an optical detector (or an optical detector array) is combined with the diffraction gratings. In the array-waveguide diffraction gratings, a plurality of waveguides having different optical lengths are combined, and different wavelengths are coupled to different output waveguides due to an interference effect.

The prior art device of Japanese Laid-Open Patent No. 8(1996)-82711, however, has the following technical disadvantages since optical separation is effected using multiple reflections:

1. External light must be collimated and then input;
2. The angle of input light must be set to a given angle; and
3. Performance of the optical filter must be varied according to its location.

Further, the prior art device of Japanese Laid-Open Patent No. 8(1996)-211237 has the following technical disadvantages since demultiplexing is effected using interference between different optical lengths:

1. An optical fiber must be optically coupled to the waveguide;
2. A possibility exists that variation in a waveguide width of the array-waveguide gratings adversely affects characteristics;
3. A thin waveguide device must be fixed to a fiber end; and
4. A slab waveguide portion must be precisely processed to uniformly distribute light.

In addition to those disadvantages, in both prior art devices, an optical coupling system is needed between the optical fiber and the demultiplexer, and a portion having a separating function (spatial separation) and a size larger than the optical fiber is needed.

Furthermore, there is not yet provided an optical fiber (typically, a plastic optical fiber having a relatively large core diameter) which has a demultiplexing/multiplexing unit provided directly on its end portion to solve the above disadvantages.

SUMMARY OF THE INVENTION

An object of the present invention is to provide an optical fiber apparatus including a demultiplexing/multiplexing unit on an end face of the optical fiber, such as an optical fiber provided with an optical detector having a demultiplexing function for separating wavelength multiplexed signals of a wavelength division multiplexing (WDM) optical transmission and for receiving respective separated optical signals, an optical detecting apparatus provided with a demultiplexing/multiplexing unit on its light receiving surface, and an optical transmission system using the same.

An optical fiber apparatus for achieving the object of the present invention includes an optical fiber and a demultiplexing/multiplexing unit for demultiplexing or multiplexing a light wave of at least a wavelength with a sufficiently narrow wavelength spectrum that is determined by a resolving power of the demultiplexing/multiplexing unit. The demultiplexing/multiplexing unit is provided or formed directly on at least an end face of the optical fiber.

Typically, the demultiplexing/multiplexing unit is provided on the end face of the optical fiber, so that needed demultiplexing and receiving are performed within an area of a size of a core of the optical fiber. For example, transmission wavelengths of the demultiplexing/multiplexing unit vary depending on its light emergence places, and optical detectors are respectively arranged at those places. Thus, where wavelength multiplexed optical signals transmitted through the optical fiber are received by a receiver per wavelength, precision needed for optical couplings and the number of positional alignment processes can be reduced.

In the structure of the present invention, a plurality of optical filters with different transmission wavelengths need not be finely provided in a small area, in contrast with the conventional apparatus. For example, when an etalon with predetermined opposite end surfaces is used, a demultiplexing/multiplexing unit whose transmission wavelengths vary depending on its light emergence places can be readily fabricated. Such a structure can be effectively built especially where the optical fiber has a relatively large core diameter or size.

Based on the above fundamental structure, the following specific structures are possible with the following technical advantages.

Typically, the demultiplexing/multiplexing unit demultiplexes or multiplexes a plurality of light waves at different wavelengths with sufficiently narrow wavelength spectra that are determined by the resolving power of the demultiplexing/multiplexing unit.

The demultiplexing/multiplexing unit is a Fabry-Perot etalon whose optical length varies along a direction approximately perpendicular to an optical-axial direction of the optical fiber. For example, the unit may be a wedge-shaped Fabry-Perot etalon including reflective mirrors wherein spacings between the reflective mirrors gradually vary along the direction approximately perpendicular to the optical-axial direction of the optical fiber. In these etalons, transmission wavelengths vary depending on places along the direction approximately perpendicular to the optical-axial direction of the optical fiber.

The demultiplexing/multiplexing unit may include a unit for preventing multiple reflection bridging paths of demultiplexed light waves such that crosstalk between adjacent demultiplexed light waves can be prevented. In such a structure, channels in the etalon can be separated from each other, and unwanted leaks of light between channels can be lowered. Thus, demultiplexing performance can be effectively improved.

The wedge-shaped Fabry-Perot etalon may be composed of an optical material having non-parallel opposite end surfaces, and a uniform refractive index and reflective films provided on the non-parallel opposite end surfaces.

The optical fiber apparatus may further include an optical detector array including a plurality of optical detectors for detecting demultiplexed light waves, and the demultiplexing/multiplexing unit may be a wedge-shaped Fabry-Perot etalon including a reflective film provided on the end face of the optical fiber and a reflective film provided on an end surface of the optical detector array. The reflective films are set in a predetermined non-parallel relationship with a spacing between the reflective films. In such a structure, no special material for the etalon is needed, so that the structure can be simplified.

The wedge-shaped Fabry-Perot etalon may further include a jig for placing the optical fiber and the optical detector array along a common axis, or a spacer for placing the optical fiber and the optical detector array with a spacing between the optical fiber and the optical detector array, to achieve the predetermined non-parallel relationship. In this case, a control unit for varying the predetermined non-parallel relationship, such as a piezoelectric element, may be further provided.

The demultiplexing/multiplexing unit may include parallel reflective films and an optical material which are sandwiched between the reflective films and have a predetermined refractive-index distribution. In such a structure, even when the reflective films are parallel, the same effect as that of the above etalon can be achieved since the optical material has the refractive-index distribution. The predetermined refractive-index distribution may be a monotonously-varying linear distribution, a stepwise distribution, a monotonously-varying stepwise distribution, or a randomly-varying stepwise distribution. The optical material having the predetermined refractive-index distribution may be a graded-index (GI) optical fiber.

The demultiplexing/multiplexing unit may include two optical materials having mutually-complementary surfaces, flat end surfaces and different refractive indices, respectively, and reflective films provided on the opposite flat end surfaces of the optical materials, respectively. The mutually-complementary surfaces are brought into a tight contact with each other to form an interface. The mutually-complementary surfaces may be stepwise mutually-complementary surfaces.

The optical fiber apparatus may further include an optical detector array including a plurality of optical detectors for detecting demultiplexed light waves, and the demultiplexing/multiplexing unit may comprise a Fabry-Perot etalon including a reflective film provided on the end face of the optical fiber and a reflective film provided on an end surface of the optical detector array.

The demultiplexing/multiplexing unit includes a diffraction grating formed on an end face of the optical fiber slantingly relative to an optical axis of the optical fiber. The diffraction grating diffracts light in different directions per wavelength.

The optical fiber apparatus may further include an optical detector array including a plurality of optical detectors for detecting demultiplexed light waves, and the optical detector array may be provided on a side surface at an end portion of the optical fiber to which diffracted light is guided from the diffraction grating. In this case, when a lens for converging light is provided between the diffraction grating and the optical detector array, wavelength separation due to dispersion of the grating can be achieved in a short range.

The demultiplexing/multiplexing unit may include a reflective surface, formed on an end face of the optical fiber for reflecting and deflecting light transmitted through the optical fiber by 45° slantingly relative to an optical axis of the optical fiber, and an optical filter array including a plurality of optical filters for selecting light at different wavelengths. The optical filter array may be provided on a side surface of the optical fiber to which reflected light is guided from the reflective surface. In this case, an optical detector array including a plurality of optical detectors for detecting light waves demultiplexed by the optical filter array may be provided on the optical filter array.

The demultiplexing/multiplexing unit may include a core-extending portion, having a refractive index different from a refractive index of a core of the optical fiber and provided on an end face of the optical fiber, and a diffraction grating formed at an interface between the core-extending portion and the core of the optical fiber.

The core-extending portion may be a core-expanding portion which gradually expands from the end face of the optical fiber. In this structure, diffracted light at different wavelengths can be easily guided to different places on an expanded end face of the core-expanding portion.

The core-extending portion may include a plurality of diffraction gratings arranged such that wavelength multiplexed light transmitted through the optical fiber is successively diffracted by each of the diffraction gratings.

An optical detector array including a plurality of optical detectors for detecting light waves demultiplexed by the demultiplexing/multiplexing unit may be provided on the demultiplexing/multiplexing unit, and the demultiplexed light waves diffracted by the diffraction grating may be guided to the optical detectors.

The demultiplexing/multiplexing unit may include a deflecting optical switch for deflecting light waves in different directions depending on the light wave's wavelength or incident timing. The deflecting optical switch may include a control unit for varying a deflection function of the deflecting optical switch. The deflecting optical switch may perform a deflection function using an acousto-optical effect, for example.

The optical fiber apparatus may further comprise an optical detector array including a plurality of optical detectors for detecting light waves demultiplexed by the demultiplexing/multiplexing unit, which is provided on the demultiplexing/multiplexing unit or an end portion of the optical fiber.

A shape of an end face of the optical fiber may be approximately coincident with a shape of a light-receiving area of the optical detector array. In this structure, the demultiplexing/multiplexing unit can be made compact in size, and the size of a signal receiving system (such as optical fiber, demultiplexing/multiplexing unit, and optical detectors) can also be reduced.

The optical fiber may include a core-expanding portion formed on an end face of the optical fiber. A core size is gradually expanded from the end face of the optical fiber.

The core-expanding portion may include a lens for converging light formed in the core-expanding portion. In this structure, the multiplexing number and a detection area of each optical detector in the detector array can be increased.

A shape of the optical detector array having a light-receiving area may be approximately coincident with a shape of an expanded end face of the core-expanding portion.

Further, the optical fiber may include a core whose shape is a square or rectangular at least at an end portion of the optical fiber. In this structure, the square core can be effectively coupled to the optical detector array, and the field distribution of emerging light from the optical fiber can be readily coincident with the incident field of the demultiplexing/multiplexing unit.

The optical fiber may be a plastic optical fiber which is formed of optical material, such as polymer and synthetic resin, which is optically transparent.

The demultiplexing/multiplexing unit may be provided or formed only on the end face of said optical fiber or on the end face and a side surface of the optical fiber.

A core of the optical fiber may be removed at an end portion of the optical fiber with a clad being partially left, and the demultiplexing/multiplexing unit may be provided on the partially left clad.

A core of the optical fiber may also be removed at an end portion of the optical fiber with a clad being entirely left, and the demultiplexing/multiplexing unit may be provided in the entirely left clad.

At least the demultiplexing/multiplexing unit may be integrally molded with an end portion of the optical fiber. In this case, the demultiplexing/multiplexing unit and the optical detector array may be integrally molded with an end portion of the optical fiber. Such an optical fiber with the integrated optical detector array and demultiplexing/multiplexing unit can be readily mounted to a board on a receiver side.

An optical detecting apparatus for achieving the object of the present invention includes an optical detecting unit including a plurality of optical detectors and a demultiplexing/multiplexing unit for demultiplexing or multiplexing a plurality of light waves at different wavelengths with sufficiently narrow wavelength spectra that are determined by the resolving power of the demultiplexing/multiplexing unit. The demultiplexing/multiplexing unit is provided or formed directly on at least a light-receiving surface of the optical detecting unit. Such an optical detecting apparatus can be made compact in size.

An optical transmission system for achieving the object of the present invention includes (1) an optical fiber through which wavelength multiplexed optical signals are transmitted where a wavelength interval of the wavelength multiplexed optical signals is $\Delta\lambda_1$ and a wavelength width occupied by each optical signal is $\Delta\lambda_2$ which is not larger than $\Delta\lambda_1$, and (2) a demultiplexing/multiplexing unit for demultiplexing or multiplexing the wavelength multiplexed optical signals with sufficiently narrow wavelength spectra that are determined by the resolving power of the demultiplexing/multiplexing unit. The narrowness is preferably about equal to $\Delta\lambda_2$. The demultiplexing/multiplexing unit is provided or formed directly on at least an end face of the optical fiber.

An optical transmission system for achieving the object of the present invention includes a light transmission line, an optical detecting unit including a plurality of optical detectors, and a demultiplexing/multiplexing unit. Wavelength multiplexed optical signals are transmitted through the transmission line and received by the optical detecting unit where a wavelength interval of the wavelength multiplexed optical signals is $\Delta\lambda_1$ and a wavelength width occupied by each optical signal is $\Delta\lambda_2$ which is not larger than $\Delta\lambda_1$. The demultiplexing/multiplexing unit demultiplexes or multiplexes the wavelength multiplexed optical signals with sufficiently narrow wavelength spectra that are determined by a resolving power of the demultiplexing/multiplexing unit. The narrowness is about equal to $\Delta\lambda_2$. The demultiplexing/multiplexing unit is provided or formed directly on at least a light receiving surface of the optical detecting unit.

The demultiplexing/multiplexing unit may include a light entrance surface for receiving light from the light transmission line and a light emergence surface, and the demultiplexing/multiplexing unit may be set such that demultiplexed optical signals of different wavelengths at least partially emerge at different positions of the light emergence surface, respectively.

The optical detectors may be provided at different positions of the light emergence surface to receive the optical signals at different wavelengths, respectively. The optical detectors may be provided on the light emergence surface such that at least one optical signal of the wavelength mutliplexed optical signals can be received separately. The optical detectors may be provided on the light emergence surface such that all the wavelength mutliplexed optical signals can be received separately.

These advantages and others will be more readily understood in connection with the following detailed description of the preferred embodiments in conjunction with the drawings.

BRIEF DESCRIPTION OF THE DRAWINGS

FIG. 21 is a cross-sectional view taken along an optical-axial direction of an optical fiber illustrating the structure of an eighteenth embodiment of the present invention.

FIG. 22A is a cross-sectional view of an optical fiber having a square core.

FIG. 22B is a view illustrating an optical detector array provided on an end face of the fiber of FIG. 22A.

DESCRIPTION OF THE PREFERRED EMBODIMENTS

First Embodiment

Figure 1A:
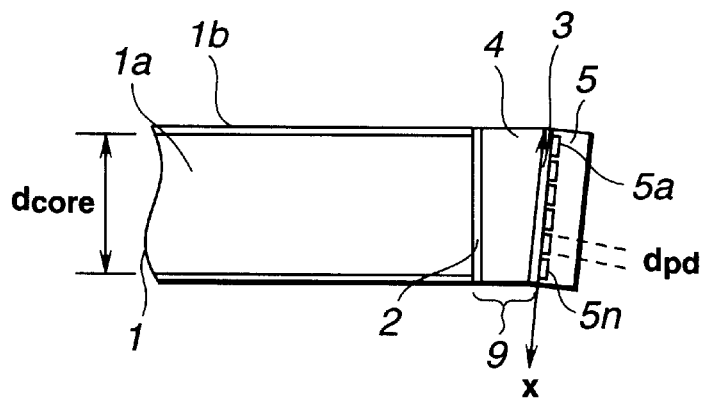
FIG. 1A is a cross-sectional view taken along an optical-axial direction of an optical fiber illustrating the structure of a first embodiment of the present invention.
Figure 1B:
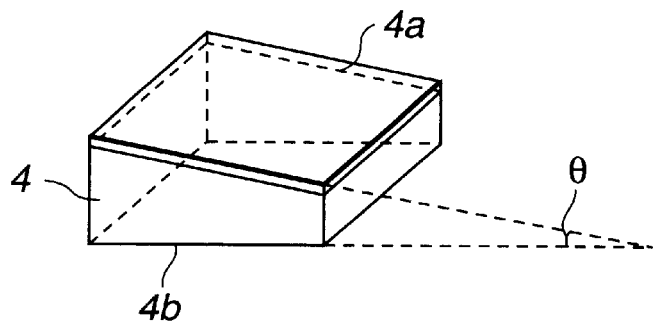
FIG. 1B is a perspective view illustrating a wedge-shaped Fabry-Perot etalon used in the first embodiment.
Figure 1C:
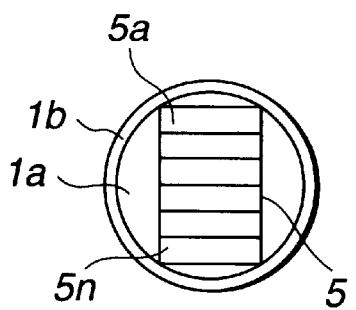
FIG. 1C is a front view illustrating an end portion of the optical fiber in the first embodiment.

A first embodiment of the present invention is shown in FIGS. 1A to 1C. In FIG. 1A, illustrating a cross section of an optical fiber 1 taken along its optical axis, the optical fiber 1 consist of a core 1a having a circular cross section and a clad 1b therearound. Reflective film 2 and 3 are provided on non-parallel opposite end faces of an optical material 4, respectively. An optical detector array 5 including a plurality of photodetectors 5a–5n, such as pin photodiodes and avalanche photodiodes, is provided on the reflective film 3. The optical material 4 and the reflective films 2 and 3 constitute a so-called Fabry-Perot etalon 9.

The Fabry-Perot etalon 9 will be described in more detail. The optical material 4 of the etalon 9 has a profile of a wedge as illustrated in FIG. 1B. Opposite end faces 4a and 4b of the optical material 4 are nearly parallel, but their non-parallel relationship is shown in an exaggerated manner in FIG. 1B. The nonparallel faces 4a and 4b of the wedge shape illustrated in FIG. 1B form an angle θ therebetween which is determined from an interval $d_{pd}$ between detectors 5a–5n of the photodetector array 5, as described later. The reflective films 2 and 3 are formed on those faces 4a and 4b. Reflectances of the reflective films 2 and 3 are determined from a wavelength resolving power required by a system to which this embodiment is applied. The size of the optical detector array 5 is approximately the same as that of a core diameter $d_{core}$ of the optical fiber 1, as illustrated in FIGS. 1A and 1C. FIG. 1C shows an end-face side of the optical fiber 1.

The angle (θ) between the two faces 4a and 4b of the wedge-shaped etalon 9 and the interval ($d_{pd}$) between detectors 5a–5n of the optical detector array 5 will be described. The following relations must be met;

$$\theta = \tan^{-1}\{[(N-1)\Delta\lambda/\lambda]/d_e/d_{core}\}$$

$$d_{pd} = [1/(N_{pd}-1)] \times d_{core}/\cos\theta,$$

where $N_{pd}$ is the number of optical detectors 5a–5n, Δλ is the wavelength interval between wavelength multiplexed optical signals transmitted through the optical fiber 1, N is the number of the multiplexed wavelengths, $d_{core}$ is the core diameter of the optical fiber 1, n is the refractive index of the optical material 4 of the etalon 9, and $d_e$ is the thickness of the etalon 9 (the thickness is not constant because of the wedge shape, but here the thickness is that of the thinnest portion), and λ is a center wavelength of the wavelength multiplexed signals. Further, FSR/(N−1)>FSR/F must be met where FSR is the free spectral range of the etalon 9, F is the finesse which is a function of the reflectance of the etalon 9 (reversely proportional to the reflectance).

Figure 3:
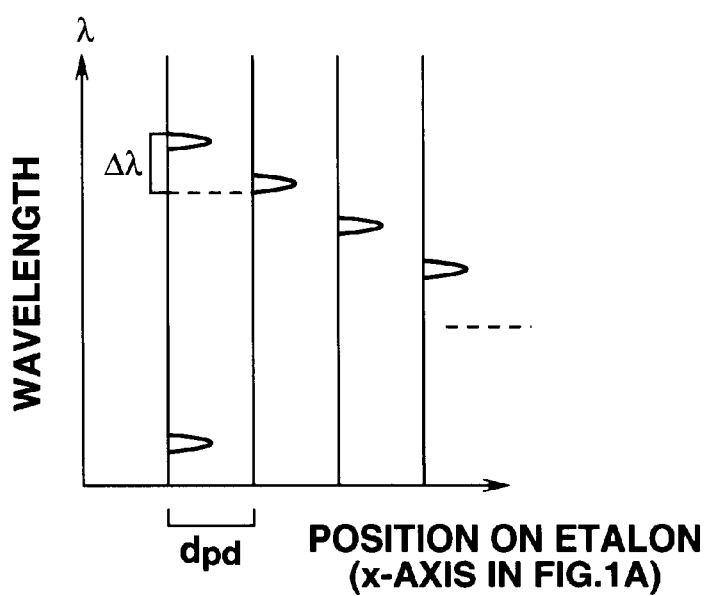
FIG. 3 is a view illustrating characteristics of the wedge-shaped etalon used in the first embodiment, which are determined by a resolving power of the etalon.

The angle (θ) of the etalon 9, reflectances of the reflective films 2 and 3, interval ($d_{pd}$) between the optical detectors 5a–5n and so forth are set such that the above conditions are met. Thereby, each optical signal of the wavelength multiplexed signals transmitted through the optical fiber 1 can be received by each of the optical detectors 5a–5n. FIG. 3 shows a transmission spectrum at each position on the etalon 9 corresponding to each detector. For example, where n=1.5, Δλ=1 nm, N=10 and $d_{core}$=1 mm (such values can be taken, typically, in a plastic optical fiber for short-distance optical transmission), it can be known from the above relations that θ must be equal to 0.0257°. The angle θ is relatively small, but this value can be achieved when fabrication techniques can attain an optical flatness with a precision of about λ/10.

When all wavelengths of N-wavelength multiplexed light are not needed to be demultiplexed by the etalon 9, i.e., M wavelengths (M<N) of the N-wavlength multiplexed optical signals are to be selected, N and $N_{pd}$ (the number of the optical detectors) in the above relations are respectively replaced by M to obtain the wedge angle (θ), interval between the detectors, reflectance of the etalon 9 and other values of this case. Only three wavelengths out of ten-wavelength multiplexed signals can be demultiplexed and received, for example.

Herein, glass having the refractive index of about 1.5 is used as the optical material 4, but the above discussion is in principle independent of such material. Accordingly, so long as the angle between faces 4a and 4b can be regulated, the optical material 4 may be a semiconductor and material of the reflective films 2 and 3 may be a dielectric multi-layer or a semiconductor multi-layer, for example.

Figure 2:
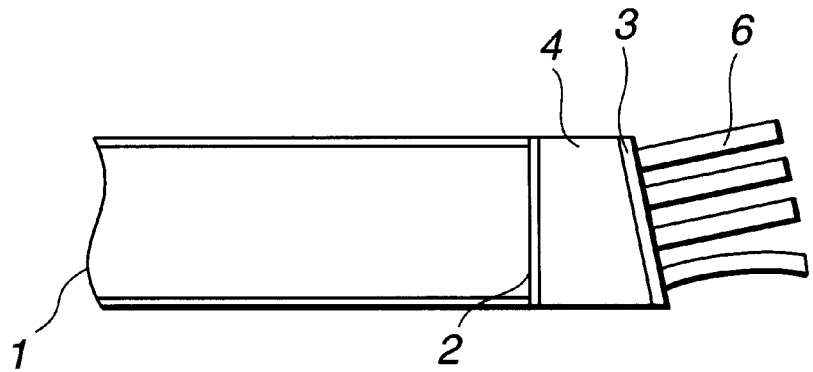
FIG. 2 is a cross-sectional view illustrating the structure of a modification of the first embodiment in which plural optical fibers are connected to the etalon in place of an optical detector array.

In FIG. 1A, the optical detector array 5 is provided on the end face of the etalon bonded to the end face of the optical fiber 1. However, a structure as illustrated in FIG. 2 is possible. In FIG. 2, end faces of plural fibers 6 are bonded to the reflective film 3 on the etalon surface to connect the respective wavelengths to different paths.

In this embodiment the optical fiber 1 is the plastic optical fiber having its core diameter of 1 mm, but the size of the fiber is not limited thereto. Material of the optical fiber 1 also is not limited to a specific one. Both quartz and plastic fibers can be used.

Further, herein the etalon 9 and the detector array 5 are fixed to the end faces of the optical fiber 1 and the etalon 9 with appropriate adhesive, respectively, but it is preferable that no adhesive is used.

The operation of this embodiment will be described. When wavelength multiplexed optical signals travel through the optical fiber 1 and reach the etalon portion, respective signals of the wavelength multiplexed optical signals transmit through different portions of the etalon 9 since respective portions of the wedge-shaped etalon 9 are set to have different transmission wavelengths. Thus, the wavelength multiplexed optical signals are spatially separated in the etalon portion owing to a difference in the wavelength. Respective detectors 5a–5n of the detector array 5 placed at the back of the etalon 9 act to receive optical signals in different channels.

It is, however, not always necessary to receive all the signals of the wavelength multiplexed signals by different detectors, respectively. Various detecting manners are possible. In one case, only several signals of wavelength multiplexed signals are demultiplexed and received by different detectors. In another case, several signals are detected by a single detector. This can be achieved by enlarging a detecting region of such a detector. Those operations are common within an applicable scope to embodiments described later.

The present invention can also be applied to a light radiating structure as well as the above light detecting structure. Specifically, the above detector array is replaced by a light source array. In this case, different radiation spectra from respective light sources are multiplexed by the etalon portion to be coupled to the optical fiber. Such a structure is especially effective where a light source with a relatively wide radiation spectrum, such as LED, is used, since the respective spectral widths are sharpened through the etalon portion and multiplexed at the end face portion of the optical fiber. This is also common within an applicable scope to embodiments described later.

Second Embodiment

Figure 4:
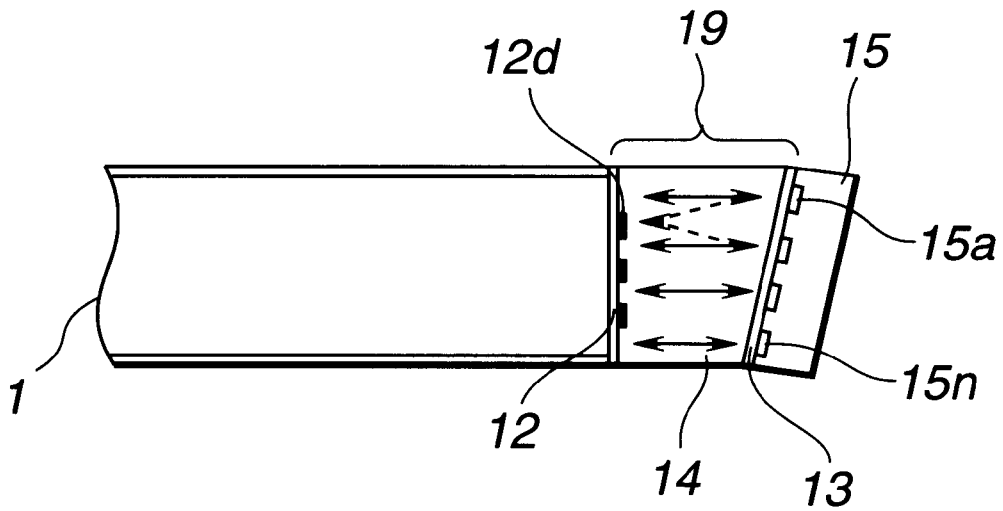
FIG. 4 is a cross-sectional view taken along an optical-axial direction of an optical fiber illustrating the structure of a second embodiment of the present invention.

A second embodiment of the present invention is shown in FIG. 4. In FIG. 4, showing a cross section of an optical fiber 1 taken along its optical axis, reflective films 12 and 13 are provided on opposite end faces of a wedge-shaped optical material 14, respectively. A wedge-shaped etalon 19 consists of the wedge-shaped optical material 14 and the reflective films 12 and 13. An optical detector array 15 including plural optical detectors 15a–15n is provided on the reflective film 13. Reflection preventing structures 12d for preventing unwanted reflection are formed on an interface portion between the reflective film 12 and the optical material 14 at intervals of $d_{pd}$. Positions of those structures 12d are shifted from positions opposingly facing the respective optical detectors 15a–15n. A wedge angle (θ) of the etalon 19, core diameter ($d_{core}$) of the optical fiber 1 and so forth have relations therebetween as described in the first embodiment.

In the second emodiment, unwanted reflection at the reflective film 12 can be prevented, and hence each light wavelength can be detected more accurately. FIG. 4 indicates undesired light, using a dotted line, which is likely to occur where no reflection preventing structure is provided. In the second embodiment, the reflection preventing structure 12d is formed by introducing a portion lacking the reflective film 12.

The reflection preventing structure 12d may be provided on both or either of the reflective films 12 and 13. The case of the formation on both sides is more effective than the case of the formation on either side, but the formation on either side can be preferable depending on the purpose of use. The reflection preventing structure may be provided not only on the reflective film but also in the optical material 14 for separating optical paths to the respective optical detectors 15a–15n from each other to construct a complete light blocking structure. Other structures and operations of this embodiment are the same as those of the first embodiment.

Third Embodiment

Figure 5A:
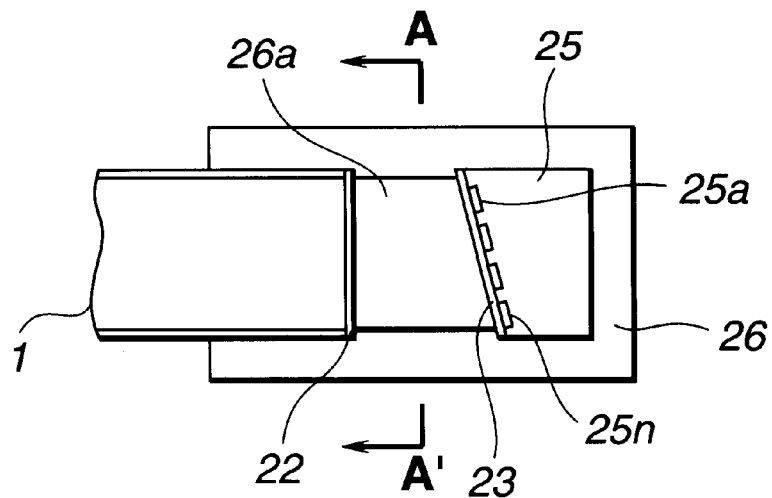
FIG. 5A is a view along an optical-axial direction of an optical fiber illustrating the structure of a third embodiment of the present invention.
Figure 5B:
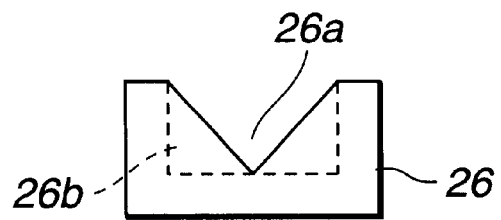
FIG. 5B is a cross-sectional view taken along line A–A' in FIG. 5A illustrating a support jig.

A third embodiment of the present invention is shown in FIGS. 5A and 5B. In FIG. 5A showing a cross section of a plastic optical fiber 1 taken along its optical axis, the optical fiber 1 includes a core having a core diameter of 1 mm. An optical detector array 25 includes plural optical detectors 25a–25n each having a light receiving surface slightly slanting relative to the end face of the optical fiber 1. Reflective films 22 and 23 are provided on the end face of the optical fiber 1 and the slanting end surface of the detector array 25, respectively. The optical fiber 1 and the optical detector array 25 are fixed in a predetermined relationship on a common axis by a support jig 26 with grooves 26a and 26b. FIG. 5B shows the support jig 26 which has the groove 26b of a square cross section for fixing the optical fiber 1, a groove for fixing the detector array 25 with a square cross section corresponding to the shape of the detector array 25, and a V-shaped groove 26a for forming a space between the optical fiber 1 and the detector array 25.

The detector array 25 has a cylindrical shape which is formed by cutting a cylinder along a direction inclining from a plane perpendicular to its central axis. The inclination angle is described later.

In the third embodiment, the reflective film 22 is formed on the end surface of the fiber 1. Further, the reflective film 23 is provided on a surface of a wedge-shaped member on which the detector array 25 is provided. The optical fiber 1 with the reflective film 22 and the detector array 25 with the reflective film 23 are fixed to the support jig 26 such that a predetermined interval distance is formed between the two reflective films 22 and 23. Thus, an etalon structure having the same function as the above-discussed wedge-shaped etalon is formed of those reflective films 22 and 23 and the space therebetween.

The inclination angle (θ) of the member on which the detectors 25a–25n are provided and so forth are determined by the following relations, similarly to those of the first embodiment:

$$\theta = \tan^{-1}\{[(N-1)\Delta\lambda/\lambda]/d_e/d_{core}\}$$

$$d_{pd} = [1/(N_{pd}-1)] \times d_{core}/\cos\theta,$$

where $N_{pd}$ is the number of optical detectors 25a–25n, Δλ is the wavelength interval between wavelength multiplexed optical signals transmitted through the optical fiber 1 and input into the demultiplexing element of this embodiment (i.e., the space between the two reflective films 22 and 23), N is the number of the multiplexed wavelengths, $d_{core}$ is the core diameter of the optical fiber 1, and $d_{pd}$ is the interval between the optical detectors 25a–25n. Here, n is equal to 1 (one) since the space between the reflective films 22 and 23 is air, and λ and $d_e$ are the same as those in the first embodiment.

In the thus-formed structure, the transmission wavelengths of portions of the demultiplexing element (etalon) corresponding to the respective optical detectors 25a–25n vary depending on the space interval, similarly to the first embodiment. Accordingly, the respective detectors 25a–25n can detect signals at different wavelengths.

Where the support jig 26 is formed of an Si member, the support jig and a portion of the optical detector can be integrated. When long-wavelength light, for which an Si detector cannot be used, is to be treated, the support jig made of material coping therewith can be used with the same effect.

In this embodiment, the detector array 25 has a cylindrical profile which can be readily supported, but a cubic shape or the like can also be used so long as the support jig can be modified corresponding thereto.

Further, when the posture of the detector array can be controlled by using a piezoelectric element or the like (i.e., the inclination angle can be changed), a wavelength range to be demultiplexed can be varied and the wavelength guided to the optical detector can be changed. Other structures and operation of this embodiment are the same as those of the first embodiment.

Fourth Embodiment

Figure 6:
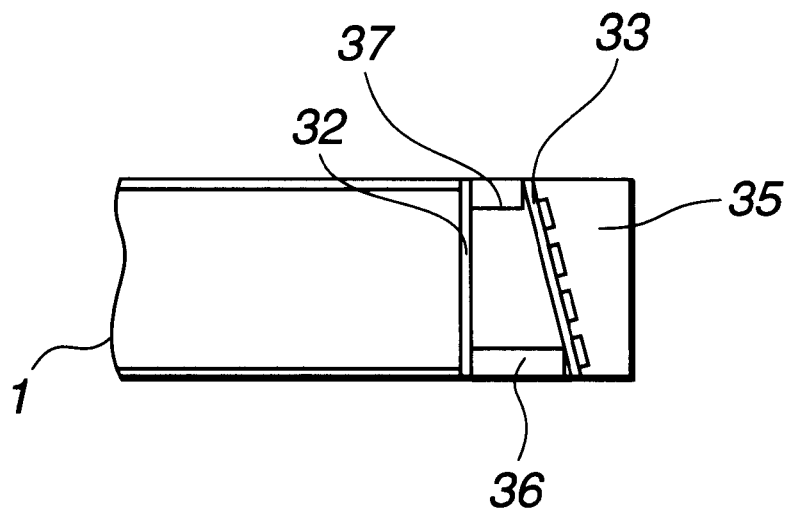
FIG. 6 is a cross-sectional view taken along an optical-axial direction of an optical fiber illustrating the structure of a fourth embodiment of the present invention.

A fourth embodiment of the present invention is shown in FIG. 6. In FIG. 6, showing a cross section of a plastic optical fiber 1 taken along its optical axis, reflective films 32 and 33 are provided on the end face of the optical fiber 1 and the end surface of an optical detector array 35, respectively. Spacers 36 and 37 are provided between the reflective films 32 and 33 such that a desired spacing can be set therebetween. In FIG. 6, the spacers 36 and 37 are composed of members having different lengths. The spacer, however, may be an annular member whose shape is appropriately formed corresponding to the cross section of the fiber 1 and the configuration of the detector array 35.

The inclination angle (θ) of the surface of the dectetor array 35 relative to the optical axis and so forth are determined as determined in the third embodiment. The spacers 36 and 37 are fixed to the end face of the fiber 1 and the detector array 35 is fixed to the spacers 36 and 37, so that the etalon having a desired spacing set by the inclination angle (θ) can be formed on the end face of the fiber 1. In this structure, postures of mirrors (the reflective films 32 and 33) of the etalon are thus established by the spacers 36 and 37. Therefore, the member for supporting the reflective film 33 (i.e., the detector array 35 in this case) need not have an inclined surface, though the detector array 35 illustrated in FIG. 6 has such an inclined surface. Thus, its fabcation can be facilitated.

Also in this embodiment, when the posture of the detector array 35 can be controlled by changing the length of a portion of the spacer by using a piezoelectric element or the like (i.e., the inclination angle can be changed), a wavelength range to be demultiplexed can be varied and the wavelength guided to the detector can be changed. Other structures and operation of this embodiment are the same as those of the first embodiment.

Fifth Embodiment

Figure 7A:
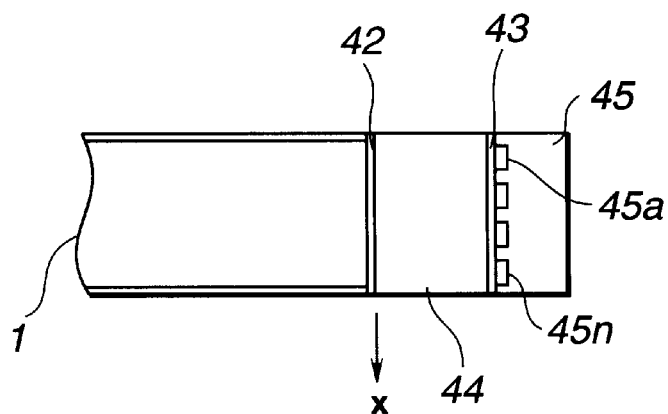
FIG. 7A is a cross-sectional view taken along an optical-axial direction of an optical fiber illustrating the structure of a fifth embodiment of the present invention.
Figure 7B:
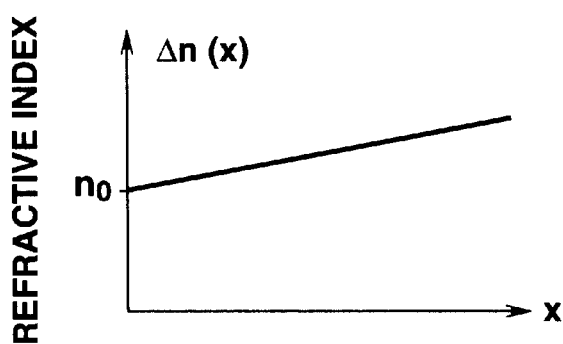
FIG. 7B is a view illustrating a refractive-index distribution of an optical material used in the fifth embodiment.

A fifth embodiment of the present invention is shown in FIGS. 7A and 7B. In FIG. 7A, showing a cross section of a plastic optical fiber 1 taken along its optical axis, reflective films 42 and 43 are provided on opposite end surfaces of an optical material 44, respectively. The optical material 44 has a refractive-index distribution therein.

The optical material 44 is shaped into a cubic or cylindrical configuration. The refractive-index distribution is introduced into the optical material 44 by doping plastic material with dopant, for example. An etalon is constructed by providing the reflective films 42 and 43 on the opposite end surfaces of the optical material 44. The refractive index in the optical material 44 has a distribution as illustrated in FIG. 7B.

The refractive-index distribution meets the following relations to construct the etalon for guiding different transmission wavelengths to respective optical detectors 45a–45n of an optical detector array 45. A change Δn(x) of the refractive-index distribuiton is given as follows:

$$\theta = \tan^{-1}\{[(N-1)\Delta\lambda/\lambda]/d_e/d_{core}\}$$

$$\Delta n(x) = n_0(1 + x/\tan\theta),$$

where $N_{pd}$ is the number of optical detectors 45a–45n, Δλ is the wavelength interval between wavelength multiplexed optical signals transmitted through the optical fiber 1 and input into the demultiplexing element of this embodiment, N is the number of the multiplexed wavelengths, $d_{core}$ is the core diameter of the optical fiber 1, and $d_{pd}$ is the interval between optical detectors 45a–45n. Here, x is an axis in a direction perpendicular to a traveling direction of light, $n_0$ is the lowest refractive index in the optical material 44, and λ and $d_e$ are the same as those in the first embodiment.

When the optical material 44 has such a distribution as illustrated in FIG. 7B, there can be provided an etalon which outputs different transmission wavelengths corresponding to places of the respective detectors 45a–45n of the detector array 45. Thus, the wavelength multiplexed signals can be demultiplexed, and the demultiplexed signals are received the respective detectors 45a–45n. The operation is the same as that of the above embodiments.

Figure 7C:
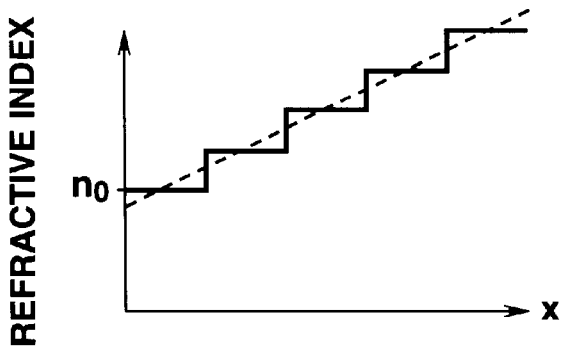
FIG. 7C is a view illustrating another refractive-index distribution of an optical material used in the fifth embodiment.

In the above structure, the refractive index of the optical material 44 is linearly changed along the x-axis, but the refractive index may be changed in a stepwise manner correspondingly to places of the detectors 45a–45n, as illustrated in FIG. 7C. In this case, the stepwise refractive-index distribution is set such that centers of respective refractive-index steps meet the above conditions. A dotted line in FIG. 7C indicates a line connecting the centers of steps.

Figure 8:
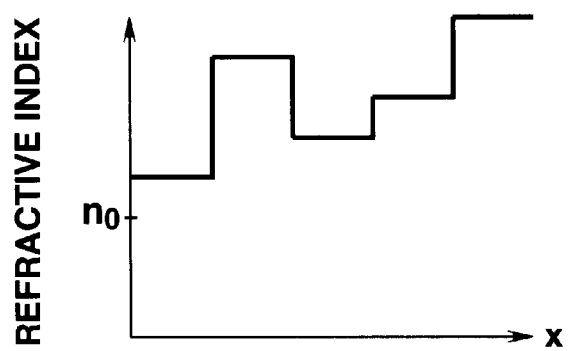
FIG. 8 is a view illustrating yet another refractive-index distribution of an optical material used in the fifth embodiment.

Further, the refractive-index distribution is not necessarily monotonously changed. The distribution only needs to be determined according to a distribution of wavelengths received by the respective detectors 45a–45n. FIG. 8 illustrates an example of a non-monotonous refractive-index distribution. Furthermore, an electro-optic material may also be used as the optical material 44, and thus the refractive-index distribution may be changed by controlling an electric field applied to the electro-optic material.

Sixth Embodiment

Figure 9:
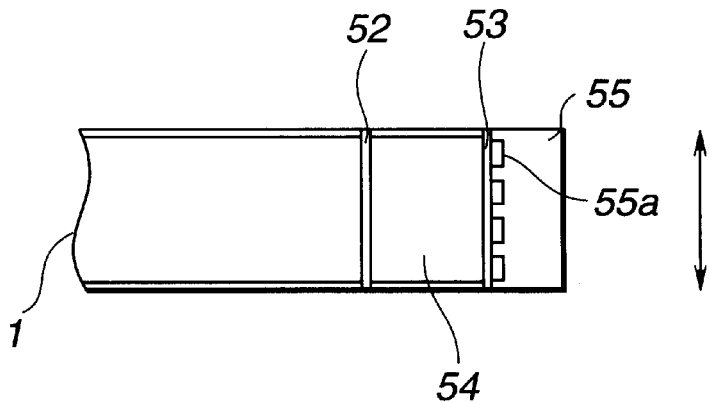
FIG. 9 is a cross-sectional view taken along an optical-axial direction of an optical fiber illustrating the structure of a sixth embodiment of the present invention.

A sixth embodiment of the present invention is shown in FIG. 9. In FIG. 9 showing a cross section of a plastic optical fiber 1 taken along its optical axis, reflective films 52 and 53 are provided on opposite end surfaces of a graded-index (GI) plastic optical fiber 54 having an appropriate length, respectively. The GI plastic optical fiber 54 constitutes an etalon whose transmission wavelength varies depending on the position along directions indicated by arrows in FIG. 9. In the GI plastic optical fiber 54, the refractive index decreases from its center toward its periphery. The index distribution approximately takes a quadratic function. Therefore, optical detectors 55a of an optical detector array 55 respectively have annular shapes around the center and are arranged at proper intervals.

The arrangement of optical detectors 55a should meet the following relations to receive desired wavelengths, respectively:

$$f(x)-f(x+\Delta x)=\Delta n$$

$$\Delta n = N\Delta\lambda/(2nd_{core})/1/(\lambda+\Delta\lambda)/x/d_{core}$$

$$f(x)=n_0-4n_0 x^2/d_{core}^2$$

$$\Delta x = d_{pd} \text{ (when } N=N_{pd}\text{)},$$

where $N_{pd}$ is the number of optical detectors 55a, $\Delta\lambda$ is the wavelength interval between wavelength multiplexed optical signals transmitted through the optical fiber 1 and input into the demultiplexing element of this embodiment, N is the number of the multiplexed wavelengths, $d_{core}$ is the core diameter of the optical fiber 1, and $d_{pd}$ is the interval between optical detectors 55a. Here, x is an axis in a direction perpendicular to a traveling direction of light, and $n_0$ is the highest refractive index at a center of the GI optical fiber 54.

The bottom relation shows a refractive-index distribution in the fiber 54 where $0<x<d_{core}/2$. The middle relation shows a desired refractive-index difference, $\Delta n$, corresponding to each channel of the multiplexed wavelengths. $\Delta x$ derived from those relations is the intervals between the optical detectors 55a. Here, the refractive-index distribution is parabolic, so that $\Delta x$ is determined by x and the detectors 55a are not arranged simply equidistantly.

The member 54 having such a refractive-index distribution is conventionally available, and the etalon can be readily constructed by appropriately setting the reflective films 52 and 53. In this case, the member 54 can be readily coupled or fixed to the optical fiber 1 since the member 54 is a cylindrical optical fiber. The operation is the same as that of the above embodiments.

Seventh Embodiment

Figure 10A:
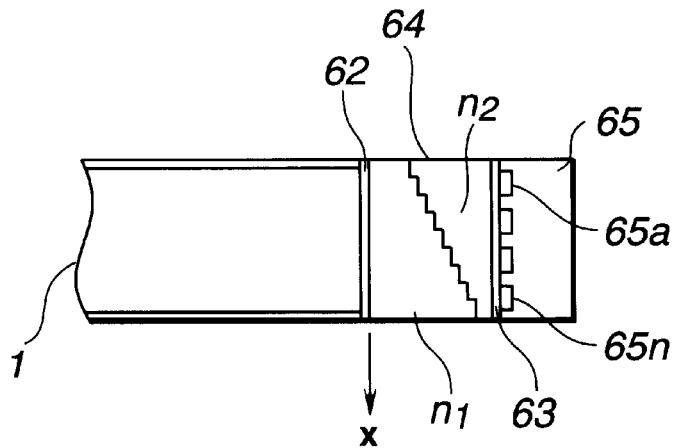
FIG. 10A is a cross-sectional view taken along an optical-axial direction of an optical fiber illustrating the structure of a seventh embodiment of the present invention.
Figure 10B:
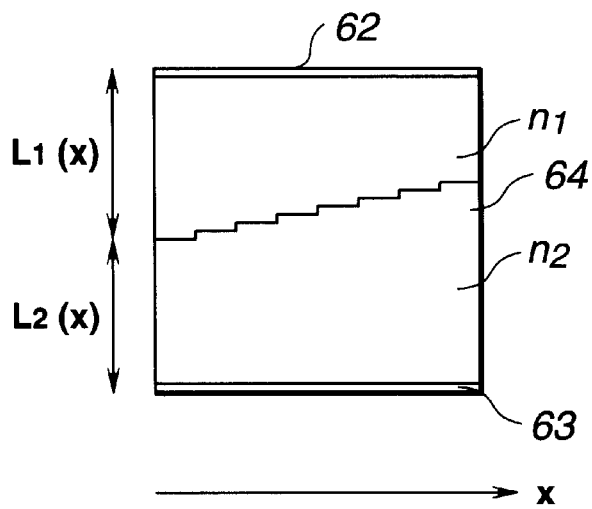
FIG. 10B is a view illustrating an optical material used in the seventh embodiment.

A seventh embodiment of the present invention is shown in FIGS. 10A and 10B. In FIG. 10A, showing a cross section of a plastic optical fiber 1 taken along its optical axis, reflective films 62 and 63 are provided on opposite end surfaces of an optical member 64 consisting of mutually-complementary optical materials having different refractive indices $n_1$ and $n_2$, respectively.

The optical member 64 is formed by bringing two optical materials with complementary stepwise surfaces into contact with each other. A stepwise interface is formed in the optical member 64, as illustrated in FIGS. 10A and 10B. The reflective films 62 and 63 are provided on flat surfaces of the two optical materials. In such a structure, optical lengths between the opposite reflective films 62 and 63 (i.e., sums ($n_1 L_1+n_2 L_2$) of products between refractive indices $n_1$ and $n_2$ and physical lengths $L_1(x)$ and $L_2(x)$) can be varied depending on the position (x).

A width ($\Delta 1$) in the optical-axial direction of each step in the stepwise refractive-index distribution can be represented as follows:

$$\Delta 1(x)=[(N-1)\Delta\lambda]/[2n(\lambda+\Delta\lambda)]\times(n_1 L_1-n_2 L_2)/(n_1-n_2),$$

where $\Delta\lambda$ is the wavelength interval between wavelength multiplexed optical signals transmitted through the optical fiber 1 and input into the demultiplexing element of this embodiment, and N is the number of the multiplexed wavelengths. Here, $n_1$ and $n_2$ are refractive indices of the two optical materials ($n_1>n_2$), $L_1$ and $L_2$ are physical lengths of the optical materials having different refractive indices $n_1$ and $n_2$, respectively, and $n=(n_1 L_1-n_2 L_2)/(L_1-L_2)$.

Since such a distribution is formed in the optical member 64, there can be formed an etalon in which optical lengths vary depending on places corresponding to the respective detectors 65a–65n of the detector array 65. That is, the transmission wavelength in the etalon varies depending on the places corresponding to the respective detectors 65a–65n, so that wavelength multiplexed signals can be demultiplexed and received by the respective optical detectors 65a–65n.

In this embodiment, $L_2(x)$ monotonously increases in the x-axial direction. The refractive-index distribution of the etalon can take any form if only a desired wavelength can be received by each optical detector, as described in the fifth embodiment. The operation is the same as that of the above embodiments.

Eighth Embodiment

Figure 11:
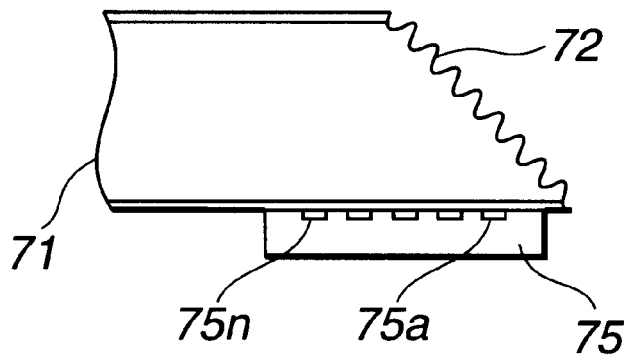
FIG. 11 is a cross-sectional view taken along an optical-axial direction of an optical fiber illustrating the structure of an eighth embodiment of the present invention.

An eighth embodiment of the present invention is shown in FIG. 11. In FIG. 11, showing a cross section of a plastic optical fiber 71 taken along its optical axis, a diffraction grating 72 is formed on an end surface of the optical fiber 71, and an optical detector array 75 is provided on an end portion of the fiber 71. The diffraction grating 72 is formed on the end surface of the optical fiber 71 by using photolithographic techniques or the like. Its angle (an angle of the grating 72 relative to a light traveling direction of the optical fiber 71), its pitch and so forth are set such that wavelength multiplexed optical signals are diffracted toward a side location of the fiber 71 on which the detector array 75 is provided.

The operation is as follows. When wavelength multiplexed optical signals are transmitted through the optical fiber 71 and reach the end portion of the fiber 71, respective signals are diffracted by the diffraction grating 72 in different directions according to their wavelengths and received by respective optical detectors 75a–75n of the detector array 75 to be converted to electric signals.

Thus, this embodiment employs wavelength dispersion characteristics of the diffraction grating whose reflection angle of light depends on its wavelength. Since the detector array 75 is provided on the side surface of the fiber 71, it is fixed along a cylindrical surface of the fiber when the fiber 71 has such a profile. Where the cross section of the fiber 71 is square, the detector array an be readily fixed to a flat side surface of the fiber 71 opposed to the diffraction grating 72. Other structures and the operation are the same as those of the above embodiments.

Ninth Embodiment

Figure 12:
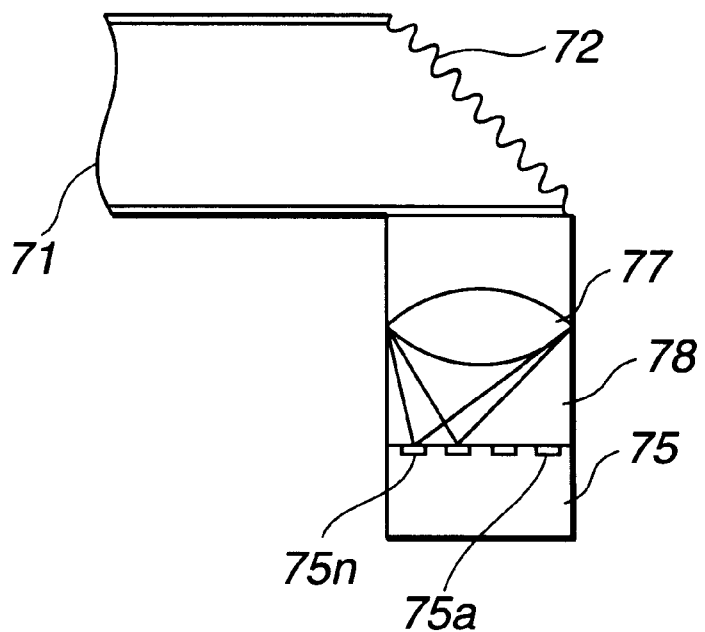
FIG. 12 is a cross-sectional view taken along an optical-axial direction of an optical fiber illustrating the structure of a ninth embodiment of the present invention.

A ninth embodiment of the present invention is shown in FIG. 12. In the ninth embodiment, a lens 77 is used to condense the diffracted light from the diffraction grating 72 onto the optical detector array 75. Thus, wavelength separation can be performed by the diffraction grating 72 more assuredly and effectively. The lens 77 is fixed to a cylindrical support jig 78, for example. The lens 77 and the detector array 75 can be integrated by molding. In this case, the integrated structure can be readily fixed to the side surface of the optical fiber 71.

Tenth Embodiment

Figure 13:
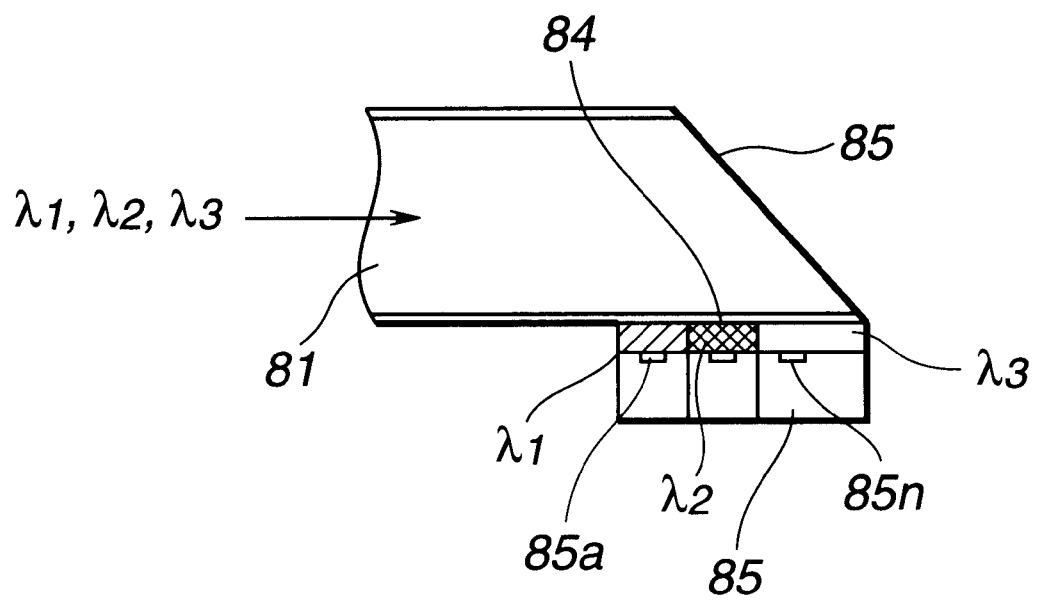
FIG. 13 is a cross-sectional view taken along an optical-axial direction of an optical fiber illustrating the structure of a tenth embodiment of the present invention.

A tenth embodiment of the present invention is shown in FIG. 13. In FIG. 13, showing a cross section of a plastic optical fiber 81 taken along its optical axis, a reflective surface 85 is formed as a 45° slantingly-cut surface of the optical fiber 81. An optical band-pass filter array 84 with different transmission wavelength bands ($\lambda_1$, $\lambda_2$, $\lambda_3$) is provided on a side surface of the optical fiber 81, and an optical detector array 85 is provided on the filter array 84. Respective filters of the band-pass filter array 84 are formed such that they can receive reflected light from the reflective surface 85 and guide different wavelengths to respective optical detectors 85a–85n of the detector array 85.

The operation is as follows. When wavelength multiplexed optical signals are transmitted through the optical fiber 81 and reach the reflective surface 85 formed on the end portion of the fiber 81, respective signals are reflected and guided to the filter array 84. Light wavelengths are selected by the respective filters of the filter array 84 and guided to the respective detectors 85a–85n of the detector array 85. Light received by the respective optical detectors 85a–85n is converted to electric signals.

Also in this embodiment, where the cross section of the fiber 81 is square, the filter array 84 and the detector array 85 can be readily fixed to a flat side surface of the fiber 81 opposed to the reflective surface 85. In this embodiment, unwanted light of the wavelength multiplexed light is removed by each band-pass filter, so the use efficiency of light is slightly lower compared to demultiplexing methods of the above embodiments. Other structures and the operation are the same as those of the above embodiments.

Eleventh Embodiment

Figure 14:
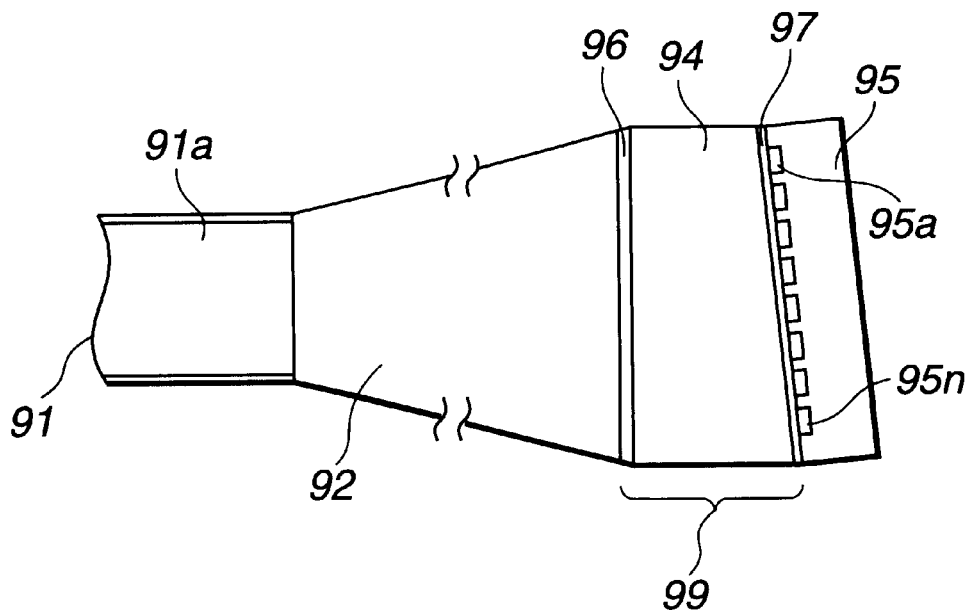
FIG. 14 is a cross-sectional view taken along an optical-axial direction of an optical fiber illustrating the structure of an eleventh embodiment of the present invention.

An eleventh embodiment of the present invention is shown in FIG. 14. In FIG. 14, showing a cross section of an optical fiber 91 taken along its optical axis, a core-expanding portion 92 is provided on an end face of the optical fiber 91 having a core 91a, such as a plastic optical fiber with a core diameter of 1 mm. A Fabry-Perot etalon 99 is provided on the core-expanding portion 92. The etalon 99 is composed of a wedge-shaped optical material 94 of a uniform refractive index and reflective films 96 and 97 provided on opposite non-parallel faces of the optical material 94, similarly to the first embodiment. An optical detector array 95 is formed on the reflective film 97. The demultiplexing function of the etalon 99 is as described in the first embodiment.

In the core-expanding portion 92, light transmitted through the optical fiber 91 is expanded to a desired magnitude. For example, where the core diameter of the optical fiber 91 is 1 mm and light is to be expanded to 5 mm, the core-expanding portion 92 needs to have a length of about 20 cm and the most expanded diameter of its end surface connected to the reflective film 96 is about 1 cm.

Light transmitted through the optical fiber 91 is gradually expanded in the core-expanding portion 92 (the length of the core-expanding portion 92 needs to have about 20 cm to expand the light naturally and gradually), and the light is converted to a light beam with a diameter of about 5 mm at the end face of the core-expanding portion 92. The expanded light is input into the etalon 99, demultiplexed and guided thereby to optical detectors 95a–95n of the detector array 95.

Also in this embodiment, where cross sections of the fiber 91, core-expanding portion 92 and etalon 99 are square, the detector array 95 having a similar square cross section can be readily fixed to a flat surface of the reflective film 97.

Other structures and the operation are the same as those of the first embodiment.

Twelfth Embodiment

Figure 15:
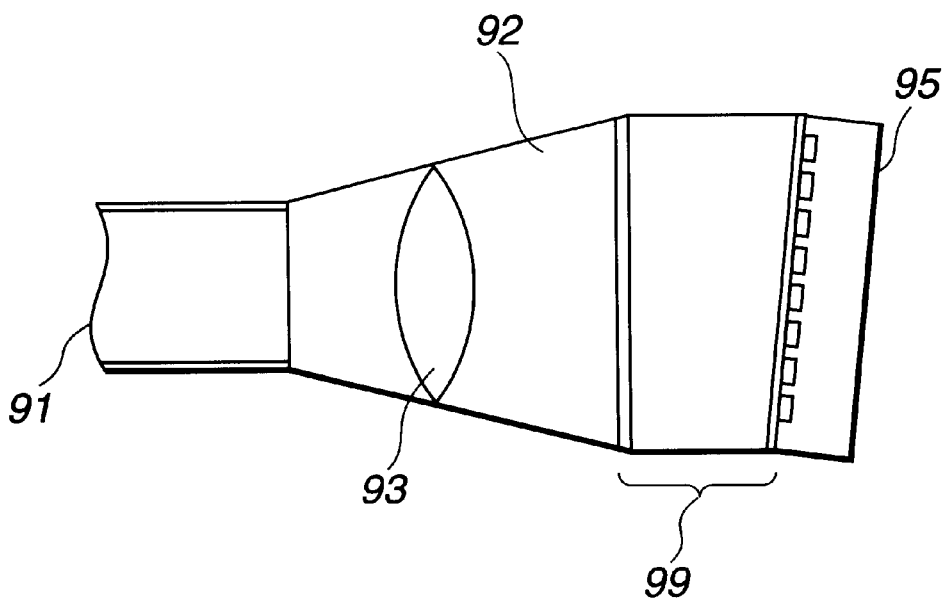
FIG. 15 is a cross-sectional view taken along an optical-axial direction of an optical fiber illustrating the structure of a twelfth embodiment of the present invention.

A twelfth embodiment of the present invention is shown in FIG. 15. In FIG. 15, showing a cross section of an optical fiber 91 taken along its optical axis, an optical member 93 having a lens function is inserted into the core-expanding portion 92. Here, a convex-shaped lens 93 having a refractive index different from that of the core-expanding portion 92 is inserted. In this structure, light can be expanded to a desired magnitude by the core-expanding portion having a shorter length than the structure of FIG. 14. Other structures and the operation are the same as those of the eleventh embodiment.

Thirteenth Embodiment

Figure 16:
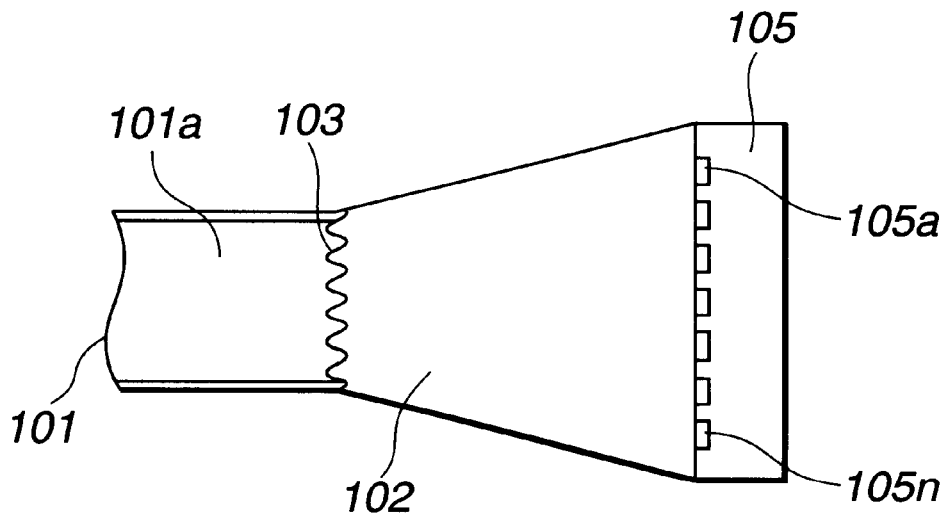
FIG. 16 is a cross-sectional view taken along an optical-axial direction of an optical fiber illustrating the structure of a thirteenth embodiment of the present invention.

A thirteenth embodiment of the present invention is shown in FIG. 16. In FIG. 16, showing a cross section of an optical fiber 101 taken along its optical axis, a diffraction grating 103 is formed at an interface between the fiber 101 having a core 101a and a core-expanding portion 102. An optical detector array 105 having optical detectors 105a–105n is provided on an expanded end face of the core-expanding portion 102. The core-expanding portion 102 has a refractive index different from that of the core 101a in the fiber 101 such that the diffraction grating 103 can be formed therebetween.

Wavelength multiplexed signals transmitted through the optical fiber 101 are diffracted by the diffraction grating 103 differently depending on their wavelengths and input into different optical detectors 105a–105n through the core-expanding portion 102. Thus, light at each wavelength is converted to an electric signal in the detector. Similarly to the twelfth embodiment, an optical member with a lens function may be inserted into the core-expanding portion 102 to shorten the length of core-expanding portion 102. Other structures and the operation are the same as those of the above embodiments.

Fourteenth Embodiment

Figure 17:
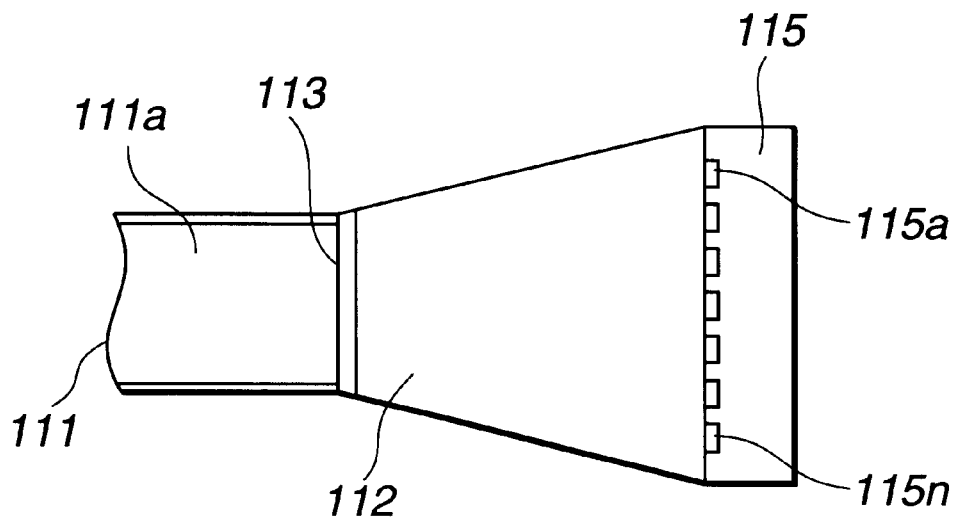
FIG. 17 is a cross-sectional view taken along an optical-axial direction of an optical fiber illustrating the structure of a fourteenth embodiment of the present invention.

A fourteenth embodiment of the present invention is shown in FIG. 17. In FIG. 17, showing a cross section of an optical fiber 111 taken along its optical axis, a deflecting optical switch 113 is provided on an end face of the optical fiber 111 having a core 111a. A core-expanding portion 112 is provided on the deflecting optical switch 113. An optical detector array 115 having optical detectors 115a–115n is formed on an expanded end face of the core-expanding portion 112. The deflecting optical switch 113 has, for example, a structure in which light is deflected to a varying direction depending on its wavelength due to the acousto-optical effect, or light is scan-deflected with time.

In this embodiment, time division multiplexed optical signals transmitted through the optical fiber 111 are deflected to different directions per channel by the deflecting optical switch 113. Each deflected light signal is input into a desired detector 115a–115n of the detector array 115. Other structures and the operation are the same as those of the eleventh embodiment.

Fifteenth Embodiment

Figure 18:
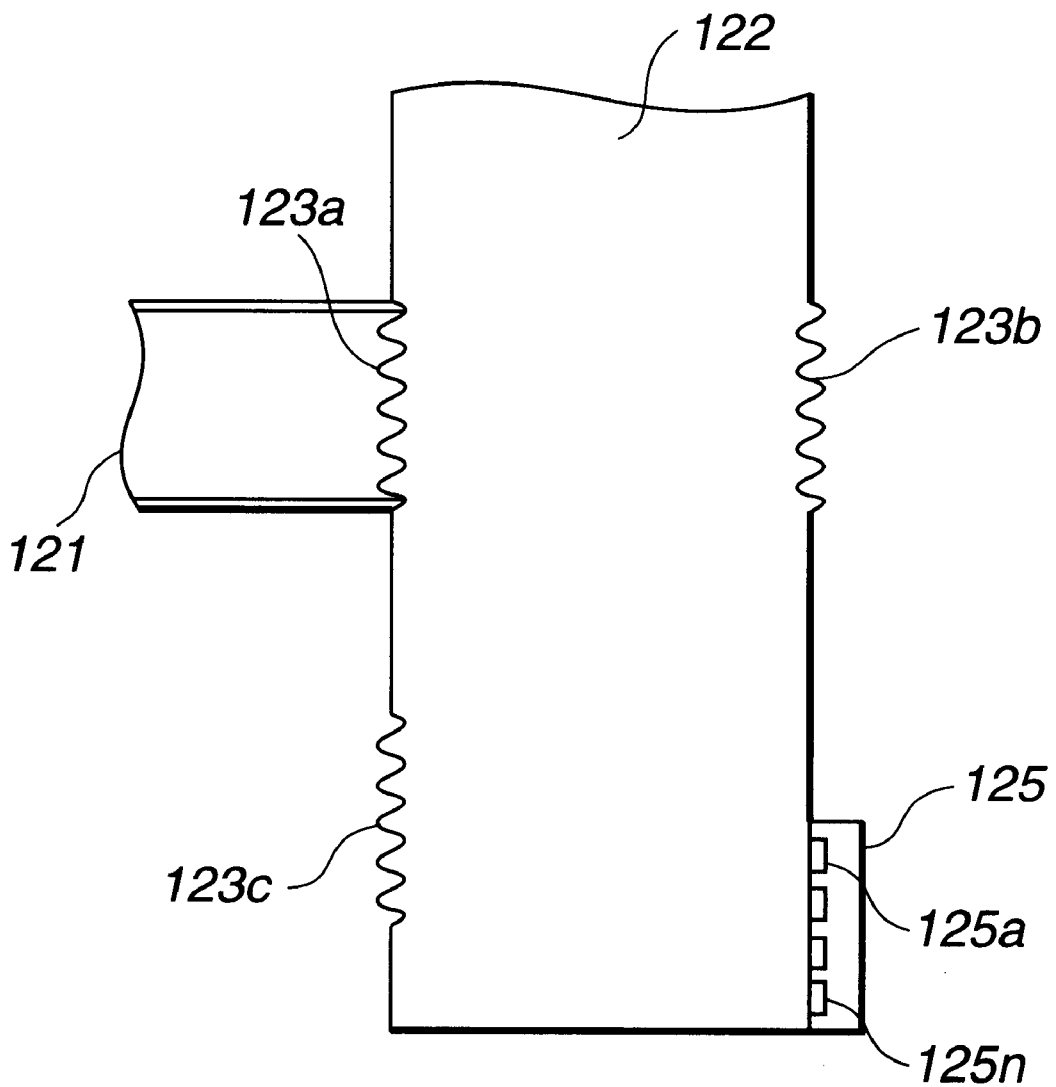
FIG. 18 is a cross-sectional view taken along an optical-axial direction of an optical fiber illustrating the structure of a fifteenth embodiment of the present invention.

A fifteenth embodiment of the present invention is shown in FIG. 18. In FIG. 18, showing a cross section of an optical fiber 121 taken along its optical axis, a demultiplexing portion 122 is connected to the optical fiber 121. Diffraction gratings 123a–123c are formed on surfaces of the demultiplexing portion 122. The diffraction grating 123a is formed at an interface between the optical fiber 121 and the demultiplexing portion 122. An optical detector array 125 with optical detectors 125a–125n is provided on the surface of the demultiplexing portion 122.

Wavelength multiplexed signals transmitted through the optical fiber 121 are received and diffracted by the diffraction grating 123*a*, and the diffracted light is guided to the diffraction grating 123*b*. Then, light diffracted by the diffraction grating 123*b* is guided to the diffraction grating 123*c* and diffracted thereby to be guided to the detector array 125. Here, the wavelength multiplexed optical signals are successively diffracted by the plural diffraction gratings 123*a*–123*c* and input into the detector array 125, so that demultiplexing can be performed with a high wavelength resolving power. Other structures and the operation are the same as those of the thirteenth embodiment.

Sixteenth Embodiment

Figure 19:
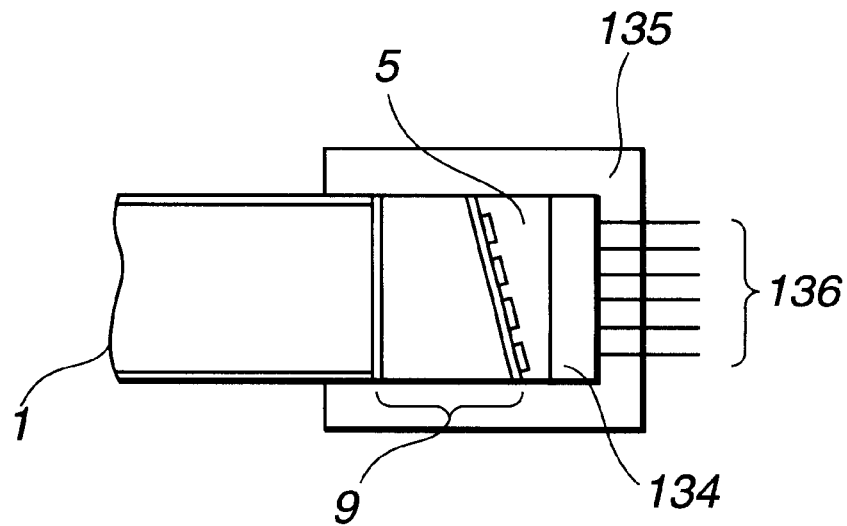
FIG. 19 is a cross-sectional view taken along an optical-axial direction of an optical fiber illustrating the structure of a sixteenth embodiment of the present invention.

A sixteenth embodiment of the present invention is shown in FIG. 19. In FIG. 19, showing a cross section of an optical fiber 1 taken along its optical axis, a wedge-shaped Fabry-Perot etalon 9, an optical detector array 5, and a signal receiving circuit 134 are provided on an end surface of the optical fiber 1. The end portion of the fiber 1, etalon 9, detector array 5 and signal receiving circuit 134 are molded with resin 135. The wedge-shaped Fabry-Perot etalon 9 can have a structure as described in the first to seventh embodiments. The molding resin 135 is formed such that the etalon 9, detector array 5 and signal receiving circuit 134 are encompassed thereby. Electrode terminals 136 connect the signal receiving circuit 134 to an external unit through the resin 135 such that an electric power can be supplied to an electric power source of the signal receiving circuit 134 and electric signals converted from received optical signals can be taken out.

In such a structure, optical components (herein the wedge-shaped Fabry-Perot etalon 9 and the detector array 5 such as a pin photodiode) and electric components (herein the signal receiving circuit 134) can be readily fixed to the end face of the optical fiber 1 under an optical-axial alignment condition. Thus, axial deviations between the components can be readily prevented.

An electric power is supplied to the signal receiving circuit 134 through a few (for example, two) of the electrode terminals 136. The signal receiving circuit 134 processes the signals detected by the optical detector array 5 and outputs the processed signals to other electrode terminals 136. The operation of the optical portion is the same as that of the first embodiment.

Seventeenth Embodiment

Figure 20:
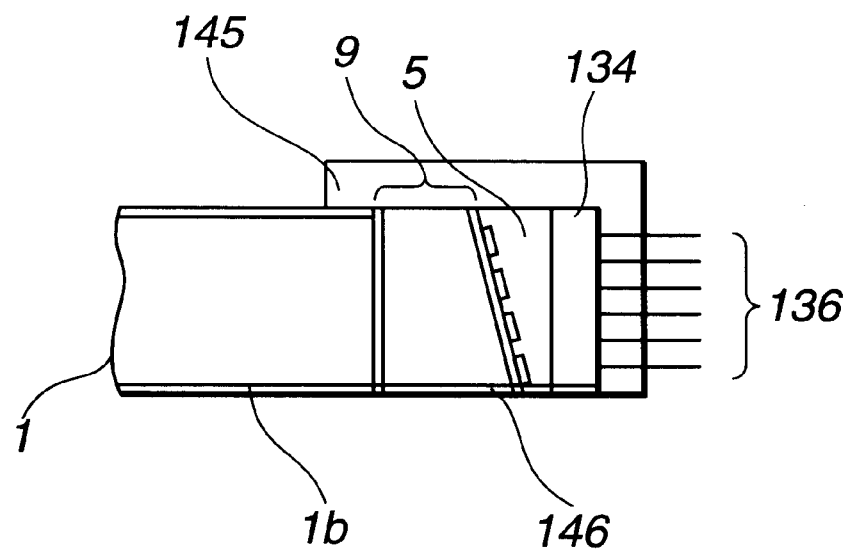
FIG. 20 is a cross-sectional view taken along an optical-axial direction of an optical fiber illustrating the structure of a seventeenth embodiment of the present invention.

A seventeenth embodiment of the present invention is shown in FIG. 20. While the wedge-shaped Fabry-Perot etalon 9 and the detector array 5 are stacked in a mutual contact state on the end face of the optical fiber 1 and molded with the resin 135 in FIG. 19, in the seventeenth embodiment a portion 146 of the optical fiber 1 (here a clad 1*b* at an end portion of the optical fiber 1) is left extending in its axial direction and optical and electric components are placed on the portion 146 and molded with resin 145. In this embodiment, the optical and electric components 5, 9 and 134 can be set and fixed by molding while the optical fiber 1 being layed, so its fabrication can be facilitated and its yield can be improved. Here, where the fiber 1 has a square cross section, the clad 146 on one side can be left and the optical and electric components 5, 9 and 134 can be placed and moled thereon. Hence the fabrication can be further facilitated.

An electric power is supplied to the signal receiving circuit 134 through a few (for example, two) of the electrode terminals 136. The signal receiving circuit 134 processes the signals detected by the optical detector array 5 and outputs the processed signals to other electrode terminals 136. The operation of the optical portion is the same as that of the first embodiment.

Eighteenth Embodiment

An eighteenth embodiment of the present invention is shown in FIG. 21. In FIG. 21, showing a cross section of an optical fiber 1, a portion of a core 1*a* at an end portion of the fiber 1 is removed, for example, by etching. Optical detector array 5, etalon 9, and signal receiving circuit 134 are put in an end portion 156 of a remaining clad 1*b* of the fiber 1 and molded with resin 155. In this embodiment, the optical and electric components 5, 9 and 134 can be further readily fixed, and the amount of the resin 155 to be used for molding can be reduced.

In the sixteenth to eighteenth embodiments, though demultiplexing means, such as the Fabry-Perot etalon, and the detector array are used as the optical component, the optical component is not limited thereto and other optical components can also be used for the mold structure. Further, while the optical and electric components are integrally molded in the above embodiments, only optical components are molded and the electric circuit may be placed outside the mold structure, for example.

In several embodiments discussed above, the optical fiber having a square or rectangular cross section is referred to, so such kind of optical fibers will be described in more detail hereinafter.

Where the optical fiber has a square cross section consisting of a square core 201*a* and a clad 201*b* encompassing the square core 201*a*, as illustrated in FIG. 22A, a detector array 204 also preferably has a corresponding square cross section and consists of plural rectangular optical detectors 204*a*–204*n*, as illustrated in FIG. 22B. This is also true with demultiplexing means, such as a Fabry-Perot etalon. In this structure, the shape of the core 201*a* approximately fits with the total shape of the detectors 204*a*–204*n*, so the optical fiber can be optically coupled to the respective detectors 204*a*–204*n* effectively.

In the case of a plastic optical fiber, the fiber is once shaped into a configuration having a circular cross section and then re-shaped into a square cross section by appropriately applying heat thereto. When the optical fiber has the square cross section over the entire length, the fiber can be used as a polarization conservative optical fiber which maintains the polarization state of transmitted light.

Figure 23A:
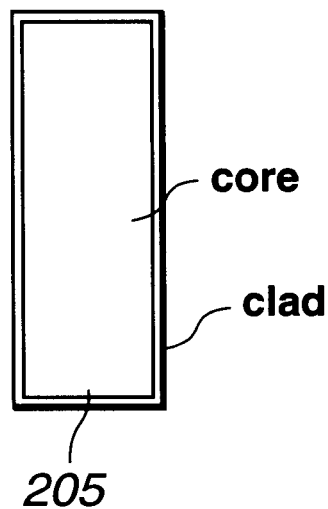
FIG. 23A is a cross-sectional view of an optical fiber having a rectangular core.
Figure 23B:
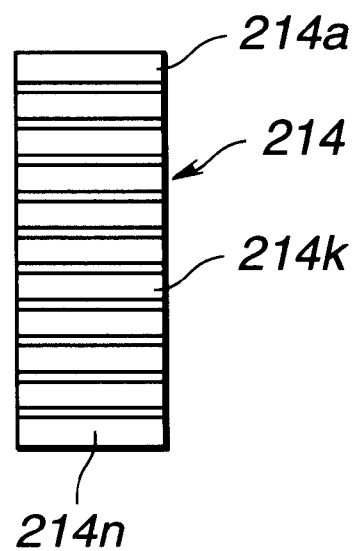
FIG. 23B is a view illustrating an optical detector array provided on an end face of the fiber of FIG. 23A.

A core-expanding portion 205 as illustrated in FIG. 23A (FIG. 23A shows a cross section at a certain location of the core-expanding portion 205) can be fixed to the end face of the fiber with a square cross section. The core of FIG. 23A is gradually expanded with respect to up and down directions while its rectangular cross section is maintained. In this case, a detector array to be fixed to the end surface of the core-expanding portion 205 has a structure consisting of optical detectors 214*a*, . . . , 214*k*, . . . , 214*n*, as illustrated in FIG. 23B. This is also true with demultiplexing means, such as a Fabry-Perot etalon.

Figure 24A:
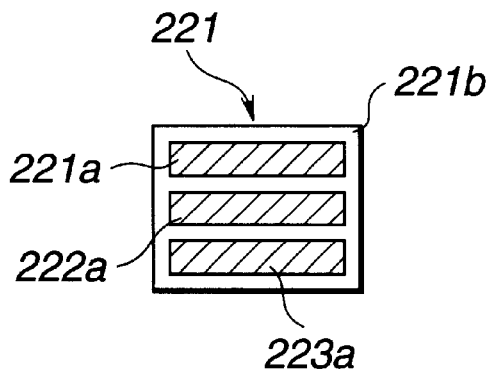
FIG. 24A is a cross-sectional view of an optical fiber having three separate rectangular cores.
Figure 24B:
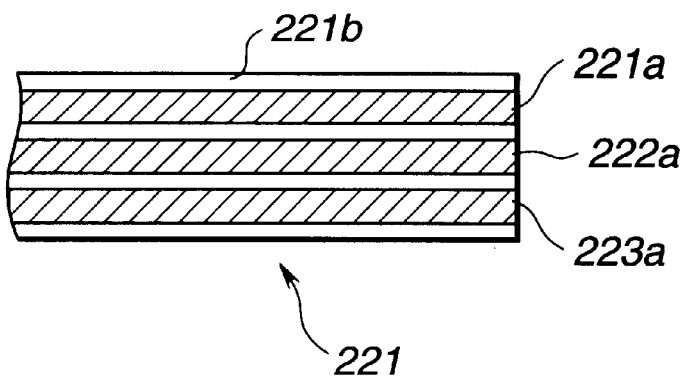
FIG. 24B is a cross-sectional view of the optical fiber of FIG. 24A taken along its optical-axial direction.

FIGS. 24A and 24B illustrate an optical fiber 221 which includes three independent rectangular-shaped cores 221*a*–223*a* and a clad 221*b* encompassing these cores 221*a*–223*a*. In the case of the separate cores over the entire length of the fiber, parallel transmission of plural channels can be readily achieved. Here, light sources such as LEDs and LDs are coupled to the respective cores 221*a*–223*a* by butt-coupling on a transmitter side, and optical detectors are formed corresponding to the respective cores 221*a*–223*a* on a receiver side. Thus, plural optical signals can be stably transmitted and received with little crosstalk. This is also true with demultiplexing means, such as a Fabry-Perot etalon.

Figure 25:
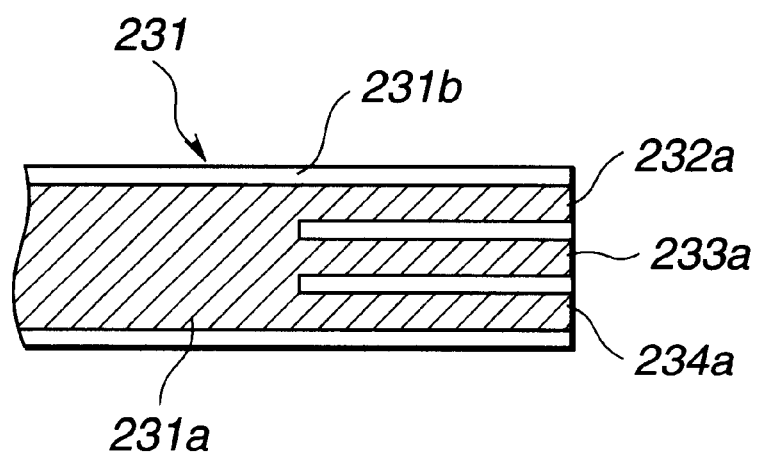
FIG. 25 is a cross-sectional view of an optical fiber having three separate rectangular cores at its end portion, taken along its optical-axial direction.

FIG. 25 illustrates an optical fiber 231 whose core 231*a* is divided into three rectangular-shaped cores 232*a*–234*a* at its end portion and which includes a clad 231b. Where the optical fiber 231 has a relatively large core size (for example, about 1 mm) which permits a large number of modes, a change of S/N ratio due to the division can be greatly lowered. Such a structure can be used as a star coupler which divides a single input into plural outputs, for example.

Figure 26:
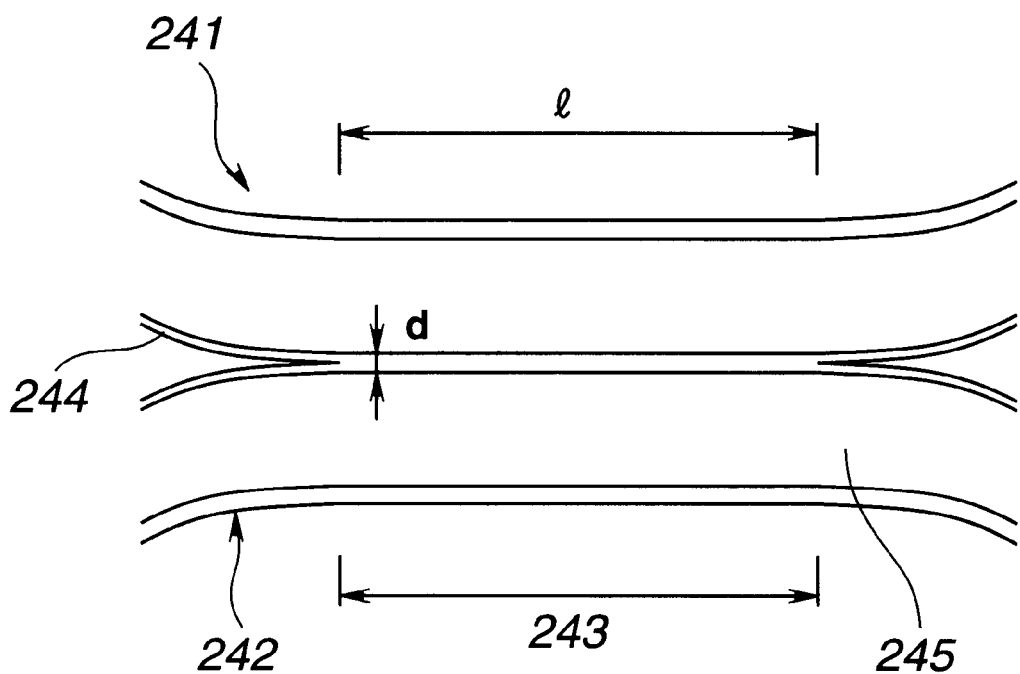
FIG. 26 is a cross-sectional view of a coupler using optical fibers having a square core, taken along its optical-axial direction.

FIG. 26 illustrates another example of an optical fiber having a core of a square cross section. In FIG. 26, reference numeral 241 denotes a first optical fiber, reference numeral 242 denotes a second optical fiber, reference numeral 243 denotes a coupling portion, reference numeral 244 denotes a clad, and reference numeral 245 denotes a core. The optical fibers 241 and 242 are respectively plastic optical fibers with a core size of about 1 mm, for example. Cores 245 of the first and second optical fibers 241 and 242 are coupled through a thin clad 244 therebetween at the coupling portion 243. The core 245 has a square cross section at least at the coupling portion 243. The coupling portion can be readily formed due to the square shape of the core 245.

In FIG. 26, the directional coupler is built with a coupling length of 1 and an interval of d. The coupling length is determined by $1=\pi/(\beta_e-\beta_o)$. However, where the optical fibers 241 and 242 are multi-mode fibers, there exist even-mode propagation constant ($\beta_e$) and odd-mode propagation constant ($\beta_o$) for each wavelength and hence appropriate coupling lengths vary depending on the wavelengths. Therefore, light can be effectively coupled from one optical fiber to another by setting the coupling length to a mean value of the coupling lengths for respective modes, though light power will not be completely transferred even in this case. Where light intensities vary for respective modes in the multi-mode fiber, the transfer of light power increases when the coupling length is determined from the propagation constants for even and odd modes in an area where there are many modes having large intensities.

Except as otherwise disclosed herein, the various components shown in outline or block form in any of FIGS. 1A–26 are individually well known in the optical fiber devices, optical detector devices, demultiplexing devices and electric circuits, and their internal construction and operation are not described herein.

While the present invention has been described with respect to what are presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. An optical fiber apparatus comprising:
   an optical fiber having an optical axial direction and an end face; and
   demultiplexing/multiplexing means provided or formed directly on at least said end face of said optical fiber,
   wherein said demultiplexing/multiplexing means demultiplexes or multiplexes a light wave of at least a wavelength with a wavelength spectrum that is determined by a resolving power of said demultiplexing/multiplexing means, and
   wherein said demultiplexing/multiplexing means comprises a Fabry-Perot etalon whose optical length varies along a direction approximately perpendicular to the optical-axial direction of said optical fiber.

2. An optical fiber apparatus according to claim 1, herein said Fabry-Perot etalon is a wedge-shaped Fabry-Perot etalon and includes reflective mirrors that are spaced apart, and wherein the space between said reflective mirrors gradually varies along the direction approximately perpendicular to the optical-axial direction of said optical fiber.

3. An optical fiber apparatus according to claim 2, wherein said wedge-shaped Fabry-Perot etalon includes (1) an optical material having non-parallel opposite end surfaces and a uniform refractive index, and (2) reflective films provided on said non-parallel opposite end surfaces.

4. An optical fiber apparatus according to claim 1, wherein said demultiplexing/multiplexing means further comprises means for preventing multiple reflection bridging paths of demultiplexed light waves such that crosstalk between adjacent demultiplexed light waves is prevented.

5. An optical fiber apparatus according to claim 1, further comprising an optical detector array including a plurality of optical detectors for detecting demultiplexed light waves,
   wherein said Fabry-Perot etalon is a wedge-shaped Fabry-Perot etalon comprising (1) a reflective film provided on said end face of said optical fiber and (2) a reflective film provided on an end face of said optical detector array, and
   wherein said reflective films are spaced apart and positioned in a predetermined non-parallel relationship.

6. An optical fiber apparatus according to claim 5, wherein said wedge-shaped Fabry-Perot etalon further comprises a jig for holding said optical fiber and said optical detector array along a common axis to achieve the predetermined non-parallel relationship.

7. An optical fiber apparatus according to claim 5, wherein said wedge-shaped Fabry-Perot etalon further comprises a spacer between said optical fiber and said optical detector array to achieve the predetermined non-parallel relationship.

8. An optical fiber apparatus according to claim 5, further comprising varying means for varying the predetermined non-parallel relationship.

9. An optical fiber apparatus according to claim 1, further comprising an optical detector array, including a plurality of optical detectors, provided on said demultiplexing/multiplexing means or on an end portion of said optical fiber, for detecting light waves demultiplexed by said demultiplexing/multiplexing means.

10. An optical fiber apparatus according to claim 9, wherein the shape of said end face of said optical fiber is approximately coincident with the shape of a light-receiving area of said optical detector array.

11. An optical fiber apparatus according to claim 9, further comprising a core-expanding portion formed on said end face of said optical fiber,
    wherein a core size of said core-expanding portion is gradually expanded from said end face of said optical fiber.

12. An optical fiber apparatus according to claim 11, wherein said core-expanding portion includes a lens formed therein for converging light.

13. An optical fiber apparatus according to claim 11, wherein the shape of a light-receiving area of said optical detector array is approximately coincident with the shape of an expanded end face of said core-expanding portion.

14. An optical fiber apparatus according to claim 9, wherein said demultiplexing/multiplexing means and said optical detector array are integrally molded with an end portion of said optical fiber.

15. An optical fiber apparatus according to claim 1, wherein a core of said optical fiber has a square or rectangular shape at least at an end portion of said optical fiber.

16. An optical fiber apparatus according to claim 1, wherein said optical fiber is a plastic optical fiber.

17. An optical fiber apparatus according to claim 1, wherein said demultiplexing/multiplexing means is provided or formed only on said end face of said optical fiber.

18. An optical fiber apparatus comprising:
an optical fiber having an optical axial direction and an end face; and
demultiplexing/multiplexing means provided or formed directly on at least said end face of said optical fiber,
wherein said demultiplexing/multiplexing means demultiplexes or multiplexes a light wave of at least a wavelength with a wavelength spectrum that is determined by a resolving power of said demultiplexing/multiplexing means, and
wherein said demultiplexing/multiplexing means comprises:
parallel reflective films; and
an optical material sandwiched between said reflective films,
wherein said optical material has a predetermined refractive-index distribution.

19. An optical fiber apparatus according to claim 18, wherein the predetermined refractive-index distribution is a monotonously-varying linear distribution.

20. An optical fiber apparatus according to claim 18, wherein the predetermined refractive-index distribution is a stepwise distribution.

21. An optical fiber apparatus according to claim 20, wherein the predetermined refractive-index distribution is a monotonously-varying stepwise distribution.

22. An optical fiber apparatus according to claim 20, wherein the predetermined refractive-index distribution is a randomly-varying stepwise distribution.

23. An optical fiber apparatus according to claim 18, wherein said optical material comprises a graded-index (GI) optical fiber.

24. An optical fiber apparatus according to claim 18, wherein said demultiplexing/multiplexing means further comprises (1) two optical materials, each having mutually-complementary surfaces, flat end surfaces and different refractive indices, respectively, and (2) reflective films provided on said opposite flat end surfaces of said optical materials, respectively, wherein said mutually-complementary surfaces are brought into a tight contact with each other to form an interface.

25. An optical fiber apparatus according to claim 24, wherein said mutually-complementary surfaces are stepwise mutually-complementary surfaces.

26. An optical fiber apparatus according to claim 18, further comprising an optical detector array including a plurality of optical detectors for detecting demultiplexed light waves,
wherein said parallel reflective films and said optical material of said demultiplexing/multiplexing means comprise a Fabry-Perot etalon, and
wherein one of said parallel reflective films is provided on said end face of said optical fiber and another of said parallel reflective films is provided on an end surface of said optical detector array.

27. An optical fiber apparatus comprising:
an optical fiber having an optical axial direction and an end face; and
demultiplexing/multiplexing means provided or formed directly on at least said end face of said optical fiber,
wherein said demultiplexing/multiplexing means demultiplexes or multiplexes a light wave of at least a wavelength with a wavelength spectrum that is determined by a resolving power of said demultiplexing/multiplexing means, and
wherein said demultiplexing/multiplexing means comprises a diffraction grating formed on said end face of said optical fiber and positioned at an angle, relative to the optical axis of said optical fiber.

28. An optical fiber apparatus according to claim 27, further comprising an optical detector array, including a plurality of optical detectors for detecting demultiplexed light waves, provided on a side surface at an end portion of said optical fiber,
wherein diffracted light is guided from said diffraction grating to said optical detector array.

29. An optical fiber apparatus according to claim 28, further comprising a lens, for converging light provided between said diffraction grating and said optical detector array.

30. An optical fiber apparatus comprising:
an optical fiber having an optical axial direction and an end face; and
demultiplexing/multiplexing means provided or formed directly on at least said end face of said optical fiber,
wherein said demultiplexing/multiplexing means demultiplexes or multiplexes a light wave of at least a wavelength with a wavelength spectrum that is determined by a resolving power of said demultiplexing/multiplexing means,
wherein said demultiplexing/multiplexing means comprises:
(1) a reflective surface formed on an end face of said optical fiber for reflecting and deflecting light transmitted through said optical fiber at an angle of 45°, relative to an optical axis of said optical fiber; and
(2) an optical filter array, including a plurality of optical filters for selecting light at different wavelengths, respectively, provided on a side surface of said optical fiber, and
wherein reflected light is guided from said reflective surface to said optical filter array.

31. An optical fiber apparatus according to claim 30, wherein said demultiplexing/multiplexing means further comprises an optical detector array provided on said optical filter array, said optical filter array including a plurality of optical detectors for detecting light waves demultiplexed by said optical filter array.

32. An optical fiber apparatus comprising:
an optical fiber having an optical axial direction and an end face; and
demultiplexing/multiplexing means provided or formed directly on at least said end face of said optical fiber,
wherein said demultiplexing/multiplexing means demultiplexes or multiplexes a light wave of at least a wavelength with a wavelength spectrum that is determined by a resolving power of said demultiplexing/multiplexing means, and
wherein said demultiplexing/multiplexing means comprises:
(1) a core-extending portion provided on an end face of said optical fiber, said core-extending portion having a refractive index different from a refractive index of a core of said optical fiber; and
(2) a diffraction grating formed at an interface between said core-extending portion and said core of said optical fiber.

33. An optical fiber apparatus according to claim 32, wherein said core-extending portion comprises a core-expanding portion which gradually expands from the end face of said optical fiber.

34. An optical fiber apparatus according to claim 32, wherein said core-extending portion comprises a plurality of diffraction gratings arranged such that wavelength multiplexed light transmitted through said optical fiber is successively diffracted by each of said plurality of diffraction gratings.

35. An optical fiber apparatus according to claim 32, further comprising an optical detector array, including a plurality of optical detectors for detecting light waves demultiplexed by said demultiplexing/multiplexing means,
wherein the demultiplexed light waves diffracted by said diffraction grating are guided to said plurality of optical detectors, respectively.

36. An optical fiber apparatus comprising:
an optical fiber having an optical axial direction and an end face; and
demultiplexing/multiplexing means provided or formed directly on at least said end face of said optical fiber,
wherein said demultiplexing/multiplexing means demultiplexes or multiplexes a light wave of at least a wavelength with a wavelength spectrum that is determined by a resolving power of said demultiplexing/multiplexing means, and
wherein said demultiplexing/multiplexing means comprises a deflecting optical switch for deflecting a light wave in different directions depending on its wavelength or incident timing, said deflecting optical switch comprising control means for varying a deflection function of said deflecting optical switch.

37. An optical fiber apparatus according to claim 36, wherein said deflecting optical switch performs a deflection function using an acousto-optical effect.

38. An optical fiber apparatus comprising:
an optical fiber having an optical axial direction and an end face; and
demultiplexing/multiplexing means provided or formed directly on at least said end face of said optical fiber,
wherein said demultiplexing/multiplexing means demultiplexes or multiplexes a light wave of at least a wavelength with a wavelength spectrum that is determined by a resolving power of said demultiplexing/multiplexing means, and
wherein said demultiplexing/multiplexing means is provided or formed on said end face and a side surface of said optical fiber.

39. An optical fiber apparatus comprising:
an optical fiber having an optical axial direction and an end face; and
demultiplexing/multiplexing means provided or formed directly on at least said end face of said optical fiber,
wherein said demultiplexing/multiplexing means demultiplexes or multiplexes a light wave of at least a wavelength with a wavelength spectrum that is determined by a resolving power of said demultiplexing/multiplexing means, and
wherein said optical fiber has a core and a clad, and the core is removed at an end portion of said optical fiber with the clad being partially left, and wherein said demultiplexing/multiplexing means is provided on said partially left clad.

40. An optical fiber apparatus comprising:
an optical fiber having an optical axial direction and an end face; and
demultiplexing/multiplexing means provided or formed directly on at least said end face of said optical fiber,
wherein said demultiplexing/multiplexing means demultiplexes or multiplexes a light wave of at least a wavelength with a wavelength spectrum that is determined by a resolving power of said demultiplexing/multiplexing means, and
wherein said optical fiber has a core and a clad, and the core is removed at an end portion of said optical fiber with the clad being entirely left, and wherein said demultiplexing/multiplexing means is provided in said entirely left clad.

41. An optical fiber apparatus comprising:
an optical fiber having an optical axial direction and an end face; and
demultiplexing/multiplexing means provided or formed directly on at least said end face of said optical fiber,
wherein said demultiplexing/multiplexing means demultiplexes or multiplexes a light wave of at least a wavelength with a wavelength spectrum that is determined by a resolving power of said demultiplexing/multiplexing means, and
wherein at least said demultiplexing/multiplexing means is integrally molded with an end portion of said optical fiber.

42. An optical detecting apparatus comprising:
optical detecting means including a plurality of optical detectors; and
demultiplexing/multiplexing means provided or formed directly on at least a light-receiving surface of said optical detecting means for demultiplexing or multiplexing a plurality of light waves at different wavelengths with wavelength spectra that are determined by a resolving power of said demultiplexing/multiplexing means,
wherein said demultiplexing/multiplexing means comprises a Fabry-Perot etalon whose optical length varies along a direction approximately perpendicular to the optical-axial direction of said optical fiber.

43. An optical transmission system comprising:
an optical fiber having an end face; and
demultiplexing/multiplexing means provided or formed directly on said end face of said optical fiber for demultiplexing or multiplexing wavelength multiplexed optical signals having a wavelength interval and a wavelength width, with wavelength spectra that are determined by a resolving power of said demultiplexing/multiplexing means,
wherein wavelength multiplexed optical signals are capable of being transmitted through said optical fiber,
wherein the wavelength interval of the wavelength multiplexed optical signals is $\Delta\lambda_1$, and the wavelength width occupied by each optical signal is $\Delta\lambda_2$, which is not larger than $\Delta\lambda_1$,
wherein said demultiplexing/multiplexing means includes (1) a light entrance surface for receiving light from said optical fiber and (2) a light emergence surface, and
wherein said demultiplexing/multiplexing means is set such that demultiplexed optical signals of different wavelengths at least partially emerge at different positions of said light emergence surface, respectively.

44. An optical transmission system comprising:
a light transmission line;
optical detecting means including a plurality of optical detectors; and demultiplexing/multiplexing means provided or formed directly on the light receiving surface of said optical detecting means, for demultiplexing or multiplexing wavelength multiplexed optical signals having a wavelength interval and a wavelength width, with wavelength spectra that are determined by a resolving power of said demultiplexing/multiplexing means, wherein wavelength multiplexed optical signals are capable of being transmitted through said transmission line and received by said optical detecting means, wherein the wavelength interval of the wavelength multiplexed optical signals is $\Delta\lambda_1$, and the wavelength width occupied by each optical signal is $\Delta\lambda_2$, which is not larger than $\Delta\lambda_1$, and wherein said demultiplexing/multiplexing means comprises a Fabry-Perot etalon whose optical length varies along a direction approximately perpendicular to the optical-axial direction of said optical fiber.

45. An optical transmission system according to claim 44, wherein said demultiplexing/multiplexing means includes (1) a light entrance surface for receiving light from said light transmission line and (2) a light emergence surface, and wherein said demultiplexing/multiplexing means is set such that demultiplexed optical signals of different wavelengths at least partially emerge at different positions of said light emergence surface, respectively.

46. An optical transmission system according to claim 45, wherein said plurality of optical detectors are provided at different positions of said light emergence surface to receive the optical signals at different wavelengths, respectively.

47. An optical transmission system according to claim 45, wherein said optical detectors are provided on said light emergence surface such that all the wavelength mutliplexed optical signals can be received separately.

48. An optical transmission system according to claim 45, wherein said optical detectors are provided on said light emergence surface such that at least one optical signal of the wavelength mutliplexed optical signals can be received separately.

* * * * *

UNITED STATES PATENT AND TRADEMARK OFFICE
CERTIFICATE OF CORRECTION

PATENT NO. : 6,334,014 B1
DATED : December 25, 2001
INVENTOR(S) : Jun Nitta et al.

It is certified that error appears in the above-identified patent and that said Letters Patent is hereby corrected as shown below:

Title page,
Item [57], ABSTRACT,
Line 10, "of of" should read -- of --.

Column 1,
Line 35, "plurality" should read -- plurality of --.

Column 9,
Line 1, "N-wavlength" should read -- N-wavelength --.

Column 11,
Line 55, "are" should read -- is --; and
Line 66, "fabcation" should read -- fabrication --.

Column 12,
Line 47, "received" should read -- received by --.

Column 14,
Line 56, "an" should read -- can --.

Column 17,
Line 55, "being layed," should read -- is being laid, --; and
Line 59, "moled" should read -- molded --.

Column 18,
Line 35, "once" should read -- first --.

Column 19,
Line 64, "herein" should read -- wherein --.

Signed and Sealed this

Twenty-third Day of April, 2002

*Attest:*

*Attesting Officer*

JAMES E. ROGAN
*Director of the United States Patent and Trademark Office*